United States Patent [19]

Moody

[11] Patent Number: 5,761,346

[45] Date of Patent: Jun. 2, 1998

[54] METHOD OF DISCRETE ORTHOGONAL BASIS RESTORATION

[75] Inventor: Edward B. Moody, Lexington, Ky.

[73] Assignee: University of Kentucky Research Foundation, Lexington, Ky.

[21] Appl. No.: 627,207

[22] Filed: Apr. 3, 1996

Related U.S. Application Data

[63] Continuation-in-part of Ser. No. 337,592, Nov. 10, 1994, abandoned.

[51] Int. Cl.$^6$ .................................................. G06K 9/40
[52] U.S. Cl. ............................................ 382/254; 382/279
[58] Field of Search ................................ 382/279, 254, 382/276

[56] References Cited

U.S. PATENT DOCUMENTS 5,249,122  9/1993  Strizke ........................... 364/413.07

OTHER PUBLICATIONS

Matzner, R., et al., "SNR Estimation and Blind Equalization (Deconvolution) Using the Kurtosis", IEEE, Oct. 27, 1994, p. 68.

Chi, C., "Performance of the SMLR Deconvolution Algorithm" IEEE, 1991, pp. 2082–2085.

Stritzke, P et al.; Funktionsszintigraphie: Eine Einheitliche Methode Zur Quantifizierung Von Stoffwechsel Und Funktion in Organen, Nucl. Med., V. 24, pp. 211–221; 1985.

Stritzke, P, et al.; Performance and Accuracy of Functional Impages & Partition Blood Flow by Deconvolution Dynamic Scintigraphic Studies (ABS) J Nuc Med, V28, p. 619; 1987.

Stritzke, P. et al.; Noninvasive Assessment of Absolute Renal Blood Flow (RBF) by Temporal Deconvolution Using Orthgonal Polynomials (DOP) (ABS), J Nuc Med, V29, pp. 862–863 1988.

Stritzke, P et al.; Deconvolution Using Orthogonal Polynomials in Nuclear Medicine: A Met. For Forming Quant. Fun. Imag. From Kinetic Stud; IIEE Tran Med Imag V9, pp. 11–23, 1990.

Stritzke, P et al.; Measurement of Glomerular Filtration Rate (GFR) & Renal Plasma Flow (RPF) or Effective Renal Plasma . . . ; (ABS) J Nuc Med, V 31, p. 914, 1990.

Moody, E; Stability Conditions for Discrete Orthogonal Olynomial Deconvultion; IIEE Trans Sig Proc, vol. 42 (8) pp. 2186–2189, Aug. 1994.

Moody, E; Discrete Orthogonal Polynomial Deconvolution for Time–Varying Systems; Revision in Review; IEEE Trans Cir II. 1994.

*Primary Examiner*—Jose L. Couso
*Assistant Examiner*—Matthew C. Bella
*Attorney, Agent, or Firm*—King & Schickli

[57] ABSTRACT

A method is described for utilizing discrete orthogonal basis to restore signal system, such as radio or sound waves and/or image system such as photographs or medical images that become distorted while being acquired, transmitted and/or received. The signal or image systems are of the linear type and may be represented by the equation [B] [o]=[i] wherein [o] is an original signal or image, [i] is a degraded signal or image and [B] is a system transfer function matrix. The method involves estimating a signal-to-noise ratio for a restored signal or image. Next, is the selecting of a set of orthogonal basis set functions to provide a stable inverse solution based upon the estimated signal-to-noise ratio. This is followed by removing time and/or spatially varying distortions in the restored system and obtaining an appropriate inverse solution vector.

17 Claims, 7 Drawing Sheets

METHOD OF DISCRETE ORTHOGONAL BASIS RESTORATION

This is a continuation-in-part of U.S. patent application Ser. No. 08/337,592, filed on Nov. 10, 1994, entitled "Method of Discrete Orthogonal Basis Restoration", now abandoned.

TECHNICAL FIELD

The present invention relates generally to the field of signal and image restoration and, more particularly to a method of restoring a signal and/or image degraded by time and/or spatially varying transfer functions.

BACKGROUND OF THE INVENTION

It is commonplace for signals, such as radio or sound waves and images such as photographs or medical images to become distorted while being acquired, transmitted and/or received. This phenomenon occurs in various types of radar, sonar, optic, imaging and electronic systems.

As an example, blurring of a photographic image may result from camera and/or object motion at the time of acquisition or may even be produced by the nature of the photographic equipment (e.g. "fish-eye" lens). In medical imaging, the type of equipment used and the way the images are acquired can have remarkable effects on the level of distortion or blurring present in the final images that are interpreted by physicians.

It should further be appreciated that the characteristics of the distorting process may change with time during the acquisition of a signal or may vary with location over different areas of an image. These time and/or spatially varying distortions in a signal and/or image must be removed to restore a signal and/or image to its undistorted form and enhance clarity.

In practical application there are imperfections in the signal or image acquisition process that make it impossible for any method to perfectly recover the original signal or image. Special mathematical techniques may, however, be utilized to closely estimate what the signal or image was before it was degraded. The time and/or spatially-varying nature of some systems makes it particularly difficult to perform a fully accurate restoration. Still, when properly applied such techniques may be utilized to substantially improve the quality of a signal or image so that it more closely approximates the true or undistorted original signal or image.

In order to further understand this process it must be appreciated that signals or images degraded by a linear system may be cast in the operator notation $[B] [o]=[i]$; where $[o]$ is the original signal or image, $[i]$ is the degraded signal or image, and $[B]$ is the system transfer function matrix. Signal or image restoration is the determination of an approximation $[o']$ to the original signal $[o]$, given a priori knowledge of the transfer function matrix $[B]$ and the forward solution $[i]$.

The most straightforward means of determining the inverse solution is by application of the transfer function matrix inverse to the forward solution, that is, $[B]^{-1} [i]=[o']$. However, determining $[o']$ by this approach frequently represents an ill-posed problem as the inverse of the transfer function may not exist (singular matrix) or $[B]^{-1}$ may be near-singular. In either case, the inverse solution cannot be determined. Further, even if $[B]$ is invertible, $[B]^{-1}$ will frequently be ill-conditioned, meaning that small perturbations in $[i]$ will lead to large perturbations in $[o']$ when the inverse solution is computed. This leads to unacceptable results. This is because all practical systems have inherent uncertainty in the measurement of $[i]$, as well as added noise, and accordingly, adequate estimation of the inverse solution $[o']$ is not possible through application of an ill-conditioned transfer function inverse.

To date, many methods have been developed to solve inverse problems arising in image processing, optics, geophysics, astronomy, spectroscopy, and other engineering and scientific disciplines. The existence of multiple solutions is primarily due to the fact that no single prior art method provides the best estimate of inverse solution in all practical applications. In fact, most prior art methods have only very specific, limited applications within specialized technical fields.

As $[B] [o]=[i]$ constitutes a linear system, solution by linear methods is an intuitively attractive approach. However, while the solution may be attempted by linear transform methods, such as Fourier transforms, the ill-conditioned nature is not circumvented by these techniques. Furthermore transform techniques are not directly applicable when the transfer function is shift-variant.

Application of transform methods to shift-variant systems have been limited to those cases where the signal or image can be sectioned into regions over which the system may be considered to be stationary. The inverse solutions for these regions are computed by transform techniques, and then spliced back together to form the overall solution. Similar sectioning into assumed stationary regions with inversion by the maximum a posteriori method has also been proposed. This sectioning and reassembly approach ("mosaicing") is, however, highly dependant on the validity of the stationary assumption, the method of reassembly, and on sampling of the forward solution and these considerations all adversely effect restoration results.

Various non-transform methods of linear inverse solution have also been developed. These include Weiner filtering, constrained Weiner filtering, maximum entropy, and pseudo-inversion techniques. These methods are usually applicable to the shift-variant case and they address the ill-conditioned nature of the problem. One drawback of such methods is, however, that they tend to not perform well in the presence of low signal-to-noise ratio (SNR) or on systems with moderate to severely degrading transfer functions. Thus they fail when they are most needed. These linear methods also do not provide super-resolution capability, and the linear iterative methods (e.g. pseudo-inversion, van Clittert's method, maximum entropy) do not have well defined termination points and can have very high memory and computational demands if a large number of iterations are performed. Thus, hardware requirements and processing times are disadvantageously increased.

The shortcomings of existing linear techniques has spawned great interest in non-linear approaches. The non-linear approaches are based on various regularization techniques that incorporate a priori knowledge of various parameters to yield an inverse solution that stabilizes and constrains the inverse solution. The parameter variables (hyperparameters) may include constraints on the form of the solution (such as non-negativity) goodness of fit parameters, statistical parameters, and assumptions of the character of added noise. Non-linear methods are usually applicable to shift-variant systems and may have super-resolution properties. The performance of these approaches is highly dependent on proper choice of the hyperparameters needed for the particular method. Furthermore, these approaches are usually iterative with poorly defined criteria for termination. For systems with well defined hyperparameters and termination criteria, and when the computational burden is not an obstacle, these are usually the preferred method of inverse solution. However, when the a priori knowledge of the system is inadequate, or when optimal termination of the iterative process is problematic, a linear method of solution is likely to produce better restoration results.

Another linear method of interest provides deconvolution for stationary systems based on the properties of the system adjoint operator. Referred to as deconvolution by the method of orthogonal polynomials (Stritzke IEEE Trans Med Imaging vol. 9, 1990, pp. 11–23), the crux of this method is the inner-product property of adjoint operator on vectors. The method requires a discrete orthogonal basis set. The original author, however, failed to define the origins of instability or the criteria for insuring a stable solution. Accordingly, the scope of practical applications of this approach is very limited.

From the above it should be appreciated that a need exists for a more versatile and effective method of signal and image restoration suited for a wide range of applications in various fields.

SUMMARY OF THE INVENTION

Accordingly, it is a primary object of the present invention to provide an efficient and dependable method for signal and/or image restoration adapted for a number of specific applications crossing a broad number of technical fields.

Another object of the invention is to provide an improved method for quickly restoring a signal and/or image system degraded by time and/or spatially varying transfer functions. Such a system reduces processing time without comprising the quality of the final or restored image.

Yet another object of the invention is to provide a discrete orthogonal basis method for quickly restoring a signal or image to an undistorted form. Advantageously, the method utilizes a mathematical processing technique requiring relatively small computer memory capacity such as found in a personal computer, so as to allow ready application by individuals in many, differing fields utilizing readily available computer hardware. Further, the method also provides uncompromising speed of operation and very effective results.

A still further object of this invention is to provide a discrete orthogonal basis restoration method particularly suited to reconstruct and restore nuclear medicine SPECT images.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided wherein discrete orthogonal basis is utilized to restore a signal and/or image system that is degraded by time and/or spatially varying transfer functions. Advantageously, the present method represents a relatively simple inverse solution that quickly and efficiently restores the system to an undistorted form. Accordingly, a clearer and more focused signal or image system results.

The method includes the step of estimating a SNR for a restored system. Additionally, there is the step of selecting of a set of orthogonal basis set functions $p_{mk}$ to provide a stable inverse solution based upon the estimated forward solution SNR.

More specifically, the estimated SNR of the restored system is provided by applying a given forward solution SNR and selected set of orthogonal basis set functions $p_{mk}$ to a realistic simulation model of the system. The set of orthogonal basis set functions $p_{mk}$ may be any orthogonal basis that spans the forward and inverse solution vector spaces. Such basis set functions include but are not limited to a group consisting of Hartley, Walsh, Haar, Legendre, Jacobi, Chebyshev, Gegenbauer, Hermite and Laguerre functions.

Next is the step of removing the time and/or spatially varying distortions in the restored system by obtaining an inverse solution vector $o_k$ for a one dimensional restoration wherein:

$$o_k = \sum_{m=1}^{M} c_{mk} \left[ \sum_{k=1}^{IU} d_{mk} i_k \right]$$

wherein:

$$[b]_m = [B]^{T*}[p]_m$$

where $[B]^{T*}$ is the transpose-complex conjugate of the matrix B and $p_m$ is an M member orthogonal basis set and a are the standard Gram-Schmidt orthogonalization coefficients;

$$\tau_{mi} = \frac{a_{mi}}{\sqrt{\sum_k c_{mk} c_{mk}}} \quad m = i;$$

$$\tau_{mi} = \frac{1.0}{\sqrt{\sum_k c_{mk} c_{mk}}} \sum_{j=1}^{m-1} a_{mj}\tau_{ji} \, m \neq i; \, i = 1, \ldots, m-1;$$

$$c_{mk} = \sum_{i=1}^{m} \tau_{mi} b_{ik};$$

$$d_{mk} = \sum_{i=1}^{m} \tau_{mi} p_{ik}. \, m = 1,2,3 \ldots M$$

Alternatively, the inverse solution vector $O_{\rho k}$ for a two dimensional system with separable spatially variant PSF the inverse solution may be obtained by successive row-column operations:

$$o_{\rho\kappa} = \sum_{m=1}^{M} c_{\kappa_{mp}} \sum_{p=1}^{IU} d_{\kappa_{mp}} J_{\rho\kappa}$$

$$\kappa = 1,2,3, \ldots IU.$$

wherein:

$$J_{\rho\kappa} = \sum_{m=1}^{M} c_{\rho_{m\kappa}} \left[ \sum_{\kappa=1}^{IU} d_{\rho_{m\kappa}} J_{\rho\kappa} \right]$$

$$\rho = 1,2,3, \ldots IU.$$

More specifically describing the invention, the estimating of the signal-to-noise ratio $SNR_{pred}$ is provided by the formula $$SNR_{pred} = 10 \log \frac{|O_{true}|^2}{|O_{noise}|^2_{inv} + |O_{intrinsic}|^2}.$$

wherein $|O_{true}|^2$ is the signal power in the original (undegraded) signal or image, $|O_{intrinsic}|^2$ the inverse solution noise power due to the approximate nature of the inverse solution and $|O_{noise}|^2$ is the noise power in the inverse solution power due to added noise in the forward solution.

Advantageously, the present method functions to define the origins of instability and behavior in the presence of noise. By applying the method to time-varying systems and using a technique for a priori determination of the SNR inverse solution, it is possible to insure stability and optimal selection of the basis set. Further, the method of inverse solution and SNR estimation may be successfully extended to the restoration of two-dimensional images degraded by spatially variant point spread functions.

The discovery of the origins of instability along with the development of an approach for selection of the optimal basis set to maximize inverse solution SNR, makes the present method a viable linear approach to inverse solution. Advantageously, the method is applicable to both stationary and shift-variant systems, is non-iterative, and is computationally efficient. Thus, the speed of processing and the size of the computer necessary to complete that processing are both reduced. Further, it should be appreciated that the only a priori information required to estimate the SNR of the inverse solution is an estimate of the forward solution noise characteristics and estimate of the inverse solution noise due to a limited basis set. Of course, in some cases the type of instrumentation or acquisition parameters may guide the optimal basis set selection (e.g. Nuclear Medicine SPECT imaging with reconstruction from projections).

As the present method is advantageously applicable to both stationary and shift-variant linear systems in one or more dimensions, potential applications for the present method include medical imaging (e.g. emission tomographic, MRI, ultrasound), image processing (lens deblurring, motion artifacts), optics and spectroscopy (light and NMR), geophysics, radar/sonar, and general electronics and electrical engineering problems. Thus, the method is extremely versatile, having application in broad ranging technical fields.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

The method of the present invention for using discrete orthogonal basis to restore a signal and/or image system created by time and/or spatially varying transfer functions will now be described in detail. The method may be applied to restore a signal or image system in a wide variety of technical fields. Stability of the inverse solution may be achieved if the characteristics of the noise in the forward solution may be estimated. For time-varying linear systems having a region of basis function support approximately congruent to the support region of the transfer function, and for which there is sufficient a priori knowledge of the system, the present method provides an efficient and noise tolerant approach to achieve inverse solution.

As previously described, the method of the present invention may be utilized to obtain an inverse solution vector for either one or two dimensional restorations. For purposes of presentation, $m=1,2,3,\ldots,M$ is the index for the vector sets with M members. The row and column vectors are designated by lowercase letters, and square matrices by uppercase letters. The system matrix transfer function is denoted by B.

Given the linear operation $$[B][o]=[i], \tag{1}$$

the purpose of this invention is to recover the length IU vector [o], given the forward solution vector [i] and a priori knowledge of the forward operator [B]. The IU×IU matrix B is constructed using the time (or spatially) varying system transfer function $h_{kn}$ so that the forward solution $i_k$ is defined by $$i_k = \sum_{n=1}^{IU} h_{kn} o_n \tag{2}$$

$$k = 1,2,3,\ldots,IU.$$

Recovery of the inverse solution requires two orthogonal function sets related to the adjoint PSF operator. The construction of these function sets (equations (4–6b)) requires a set of M orthogonal basis set functions $p_{mk}$, of length IU. The Hartley basis set, defined by $$p_{mk} = \sin\frac{2\pi(m-1)k}{IU} + \cos\frac{2\pi(m-1)k}{IU} \tag{3}$$

$$p_{(m+1)k} = \sin\left(-\frac{2\pi(m-1)k}{IU}\right) + \cos\left(-\frac{2\pi(m-1)k}{IU}\right)$$

$$k = 1,2,3,\ldots,IU$$

$$m = 1,3,5,\ldots,M-1$$

is the preferred basis for real-valued systems and will be utilized to illustrate the present method. It should be appreciated, however, that any orthogonal basis that spans the forward and inverse solution vector spaces may be utilized. These include for example, Hartley, Walsh, Haar, Legendre, Jacobi, Chebyshev, Gegenbauer, Hermite and Laguerre functions.

Figure 8:
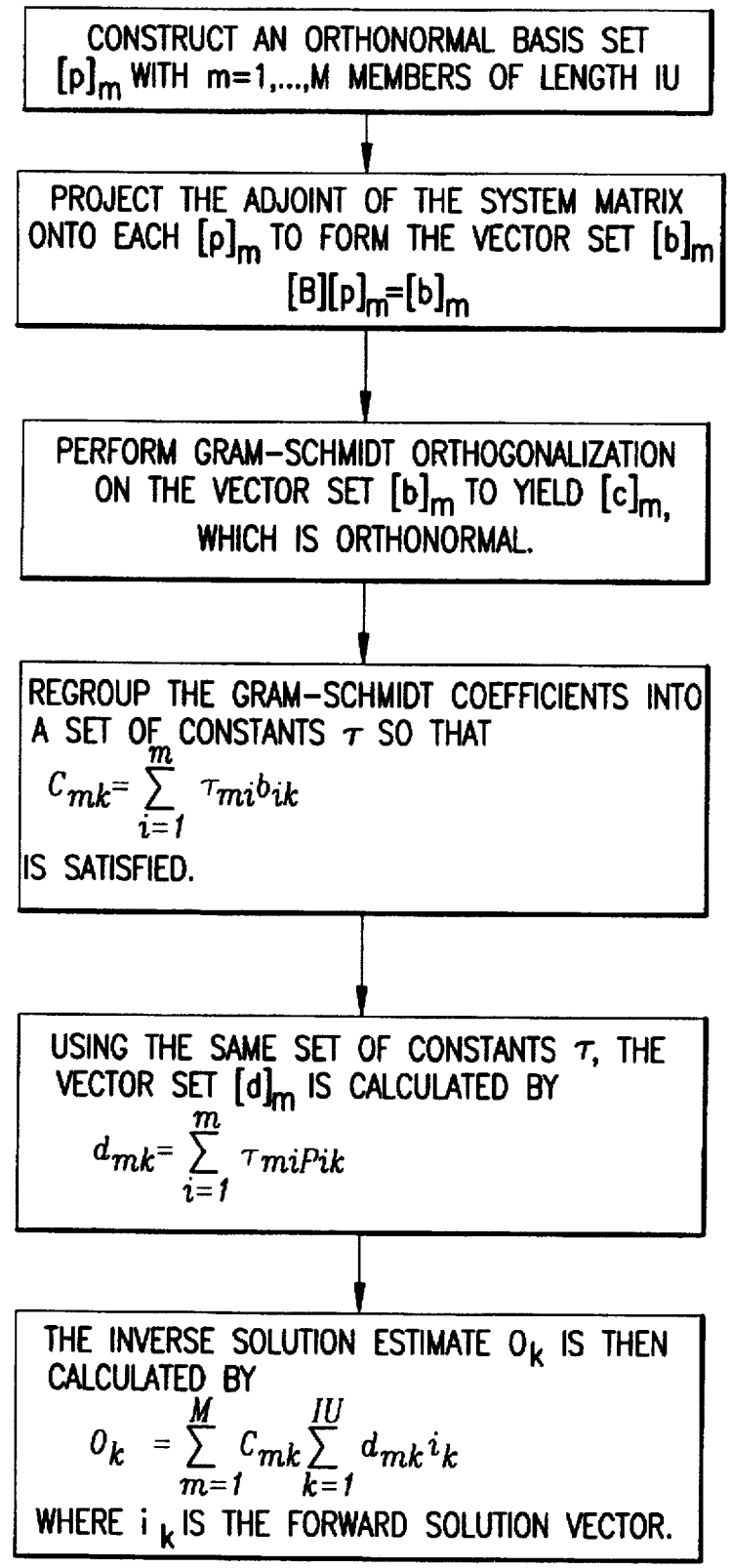
FIG. 8 is a flowchart showing the methodology of the present invention.

As can be appreciated in viewing FIG. 8, the method begins with the application of the adjoint of the forward operator to each member of the basis set $$[b]_m = [B]^{T*}[p]_m \tag{4}$$

where $[B]^{T*}$ is the transpose-complex conjugate of the matrix B.

The Gram-Schmidt orthogonalization procedure followed by normalization may be used to construct an orthonormal function set $c_{mk}$ from $b_{mk}$. Defining a set of constants $\tau_{mi}$ (5), where the constants a are the Gram-Schmidt orthogonalization constants, $c_{mk}$ may be written as a linear combination of $b_{mk}$ (6a). A second orthogonal function set $d_{mk}$ can then be constructed as a linear combination of the basis set functions $p_{mk}$, using the same set of constants $\tau_{mi}$ (6b).

$$\tau_{mi} = \frac{a_{mi}}{\sqrt{\sum_k c_{mk} c_{mk}}} \quad m = i \tag{5a}$$

$$\tau_{mi} = \frac{1.0}{\sqrt{\sum_k c_{mk} c_{mk}}} \sum_{j=1}^{m-1} a_{mj}\tau_{ji}\, m \neq i;\, i=1,\ldots,m-1 \tag{5b}$$

$$c_{mk} = \sum_{i=1}^{m} \tau_{mi} b_{ik} \tag{6a}$$

$$d_{mk} = \sum_{i=1}^{m} \tau_{mi} p_{ik}\, m = 1,2,3\ldots M \tag{6b}$$

Recovery of the inverse solution begins with the unit operator for orthonormal functions (7). Reference to (6a) and (4) yields equation (O). The property of adjoint operators on finite-dimension inner product space allows transition to (9) and equation (1) leads to (10). Equation (10) is the operational equation for the inverse solution vector for a one dimensional restoration utilizing the present method.

$$o_k = \sum_m c_{mk}\left[\sum_n c_{mn} o_n\right] \tag{7}$$

$$o_k = \sum_m c_{mk}\left[\sum_n \left\{\sum_i \tau_{mi}\left(\sum_k B^{T*}_{nk} p_{ik}\right)\right\} o_n\right] \tag{8}$$

$$o_k = \sum_m c_{mk}\left[\sum_k \left\{\sum_i \tau_{mi} p_{ik}\left(\sum_n (B_{kn} o_n)\right)\right\}\right] \tag{9}$$

$$o_k = \sum_m c_{mk}\left[\sum_k d_{mk} i_k\right] \tag{10}$$

Of course, this inverse solution $o_k$, like all method of ill-posed problem solution, is an approximation of the true solution. In the noiseless case, the quality of the inverse solution depends primarily on the equality of the representation of the true signal afforded by the chosen finite set of basis functions $p_{mk}$ where m=1,2,3 ... M is the index for the chosen orthogonal basis set with M members of length k =1,2,3 ... IU. The recovered vector $o_k$ may be expressed as a sum of the inverse solutions from the noiseless forward solution and from added noise components (see equation 11).

$$o_k = \sum_m c_{mk}\left[\sum_k d_{mk} I_{forward_k}\right] + \sum_m c_{mk}\left[\sum_k d_{mk} I_{noise_k}\right] \tag{11}$$

In the Fourier domain, the noise component term in (11) may be expressed by $$\Im(O_{noise_k}) = \sum_m C_{mi}\left[1/N \cdot \sum_i D_{mi} I^*_{noise_i}\right] \tag{12}$$

$$i = 1,2,3,\ldots,N$$

which allows an approximation of the inverse solution noise power to be made if the characteristics of the additive noise are known. The predicted SNR of the inverse solution may be estimated by $$SNR_{pred} = 10\log\frac{|O_{true}|^2}{|O_{noise_{inv}}|^2 + |O_{intrinsic}|^2} \tag{13}$$

where $|O_{true}|^2$ is the signal power in the original (undegraded) signal or image, $|O_{intrinsic}|^2$ is the inverse solution noise power due to the approximate nature of the inverse solution, and $|O_{noise}|^2$ is the noise power in the inverse solution power due to added noise in the forward solution.

For a given system, an a priori estimate of the inverse solution SNR can be made for various values of $SNR_{forward}$ using equations (12) and (13). Noise power in the inverse solution due to added noise may be estimated by assigning values to $$I^*_{noise_i}$$

(12) based on assumptions of the character and magnitude of added noise. Simulation studies with well modeled noiseless signals allow estimation of intrinsic noise, $|O_{intrinsic}|^2$ in the inverse solution. With an estimate of the original signal power, the $SNR_{pred}$ for the inverse solution may be computed using equation (13).

The following example is presented for purposes of further illustrating the present invention, but it is not to be considered as limited thereto.

EXAMPLE 1

An exponentially decaying transfer function with linearly time-varying amplitude and time constant was chosen for purposes of demonstration. The behavior of the time-varying transfer function $h_{kn}$ is defined by $$h_{kn} = \left( 0.5 + \frac{0.5 \cdot n}{N} \right) e^{-1 \frac{k-n}{\frac{6.0 \cdot n}{N} - 6.0}} \quad l^2$$

Figure 1A:
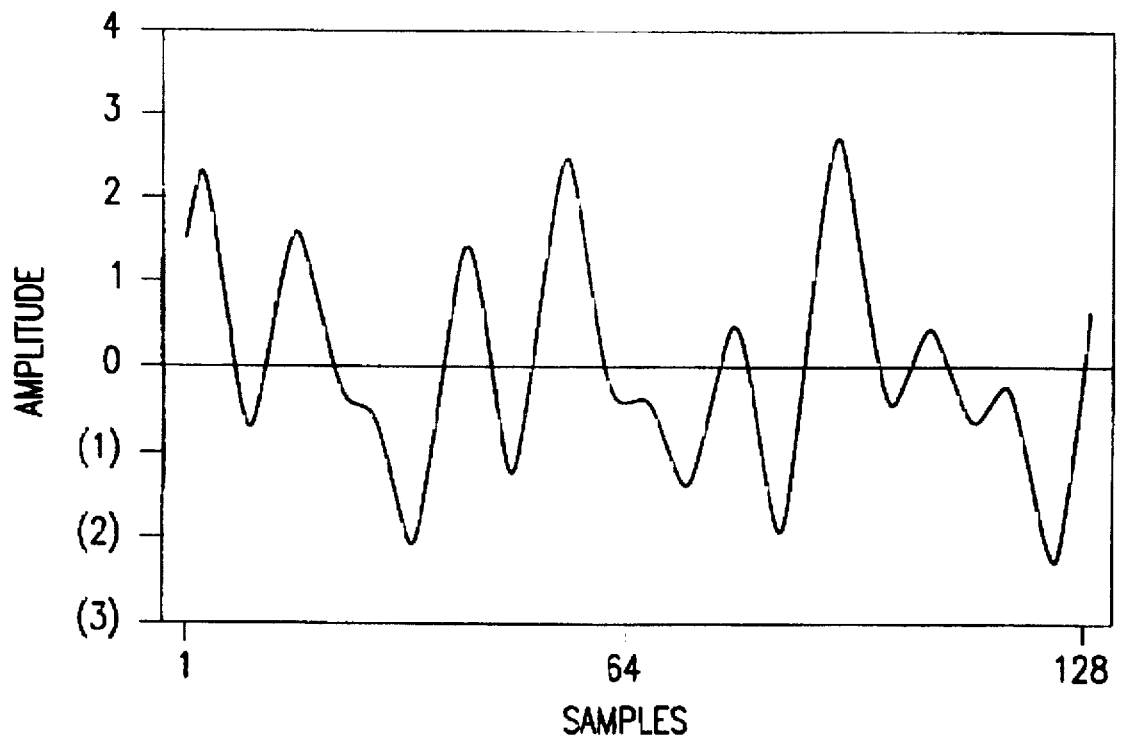
FIG. 1 graphically shows the original signal (a) is the sum of three unity amplitude sinusoids ($f_1=3$ cycles/$2\pi$, $\phi_1=0.1$ radian; $f_2=7$ cycles/$2\pi$, $\phi_2=1.0$ radian; $f_3=10$ cycles/$2\pi$, $\phi_3=0.6$ radian). The forward solution (b) results when the time-varying decaying exponential system described by transfer function $h_{t,n}$ acts on the original signal (see equation in Example 1, page 20). Pseudorandom zero-mean noise is added to produce forward solutions with SNR of 20 dB (c), and 10 dB (e). The inverse solutions obtained by the method using a Hartley basis set from 0–10 cycles/$2\pi$ had $SNR_{inverse}$ of 19.26 dB ((d), solid line) for the 20 dB forward solution, and $SNR_{inverse}=10.33$ dB ((f), solid line) for the 10 dB forward solution. The broken line in (d) and (f) is the original signal.
Figure 1B:
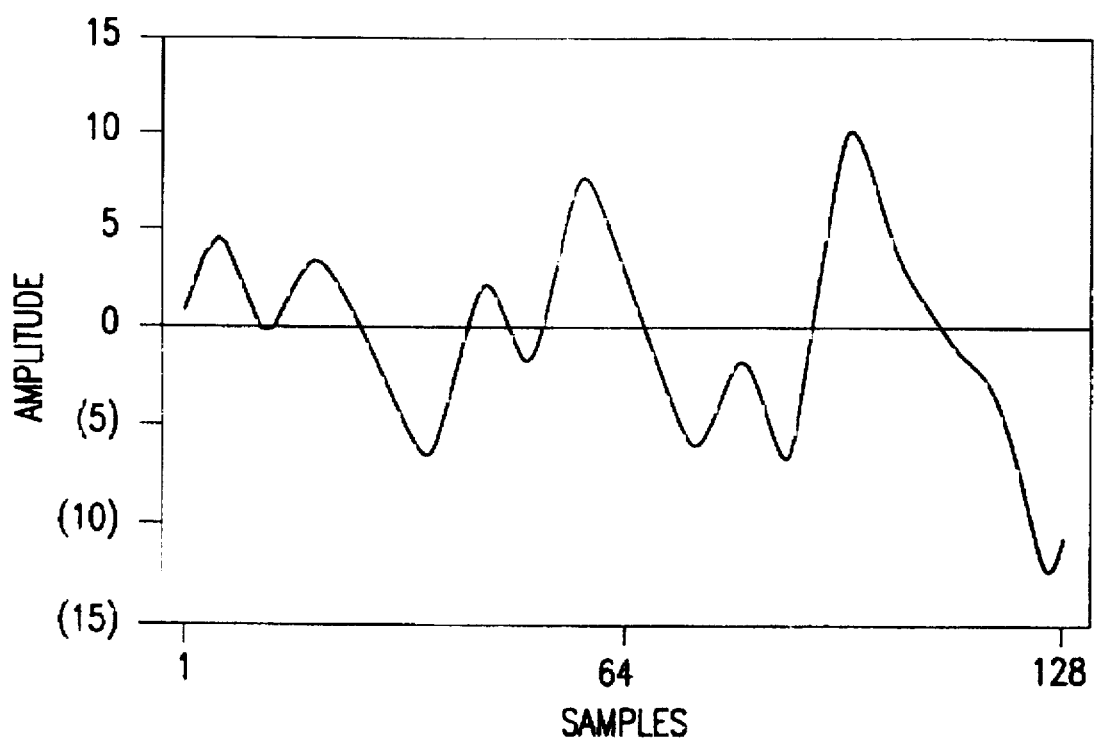
Figure 1C:
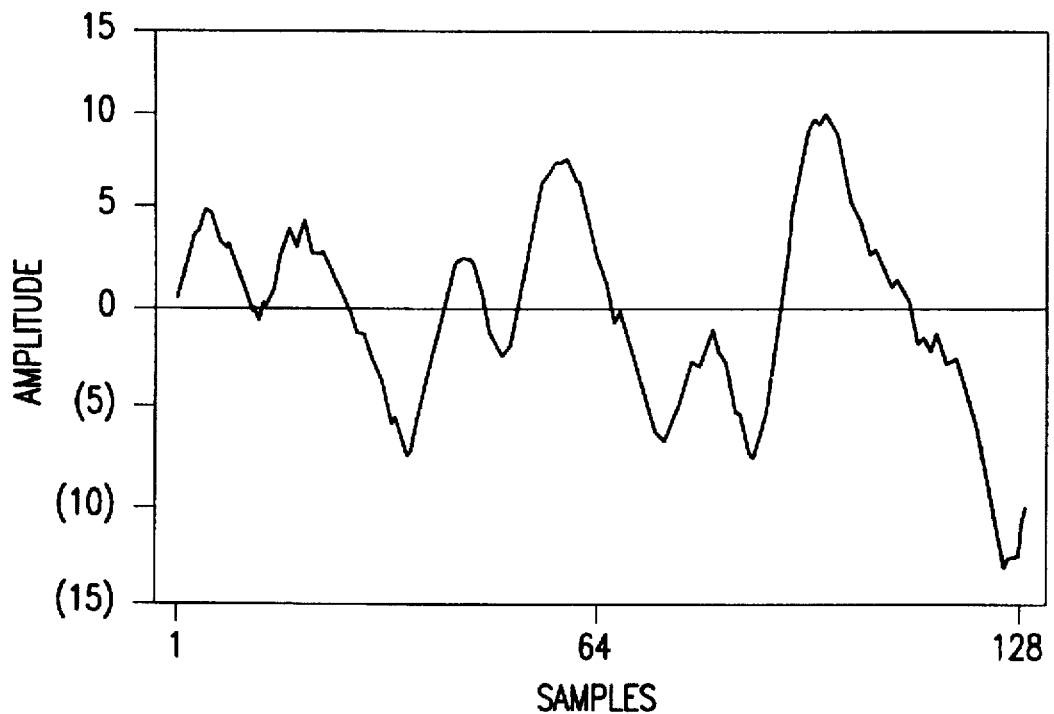
Figure 1D:
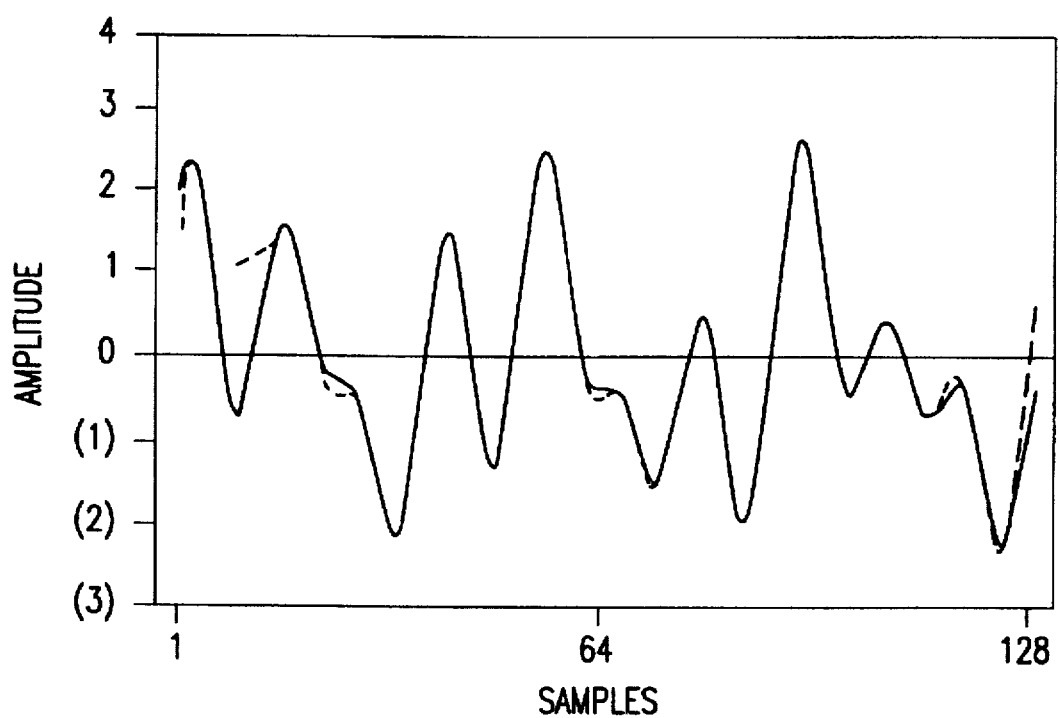
Figure 1E:
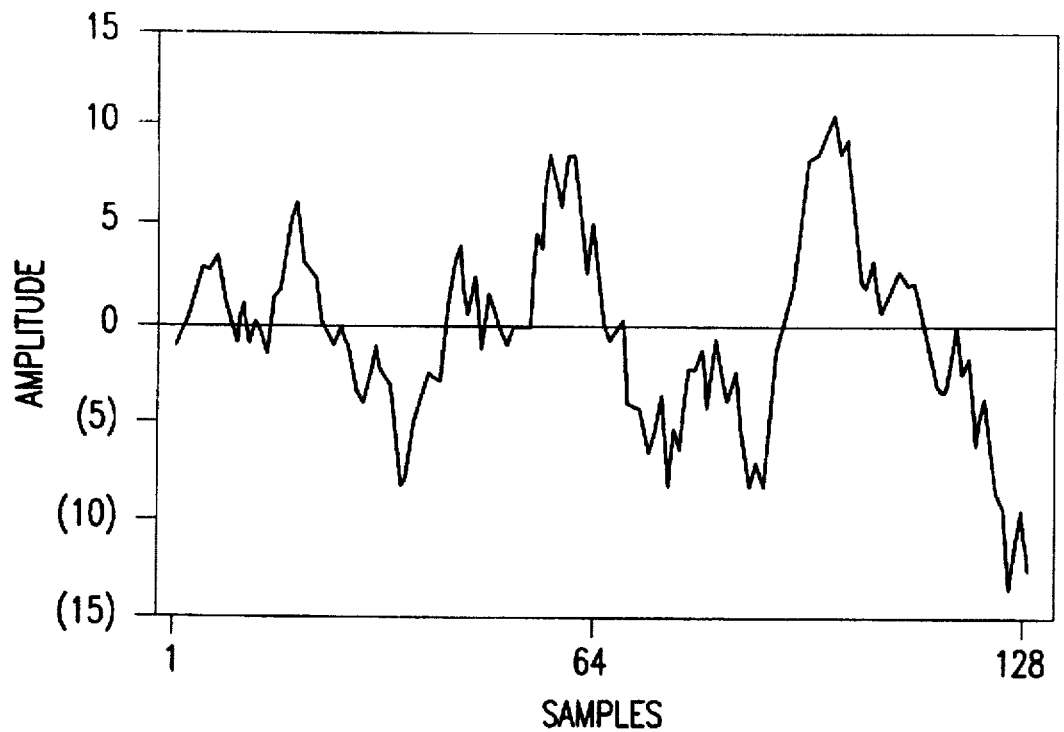
Figure 1F:
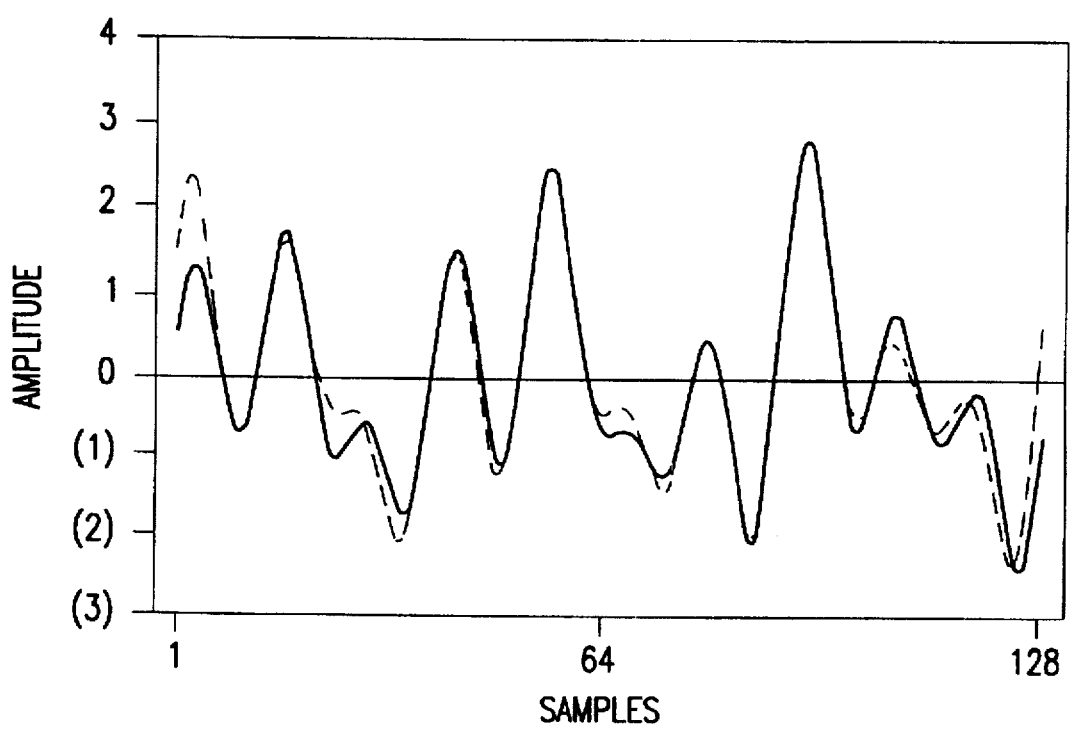

The input function (Fig 1(a)) is a summation of three unity amplitude sinusoids of arbitrarily chosen frequency and phase ($f_1=3$ cycles/$2\pi$, $\phi_1=0.1$ radian; $f_2=7$ cycles/$2\pi$, $\phi_2=1.0$ radian; $f_3=10$ cycles/$2\pi$, $\phi_1=0.6$ radian). Zero-mean pseudo-random noise was added to the forward solution (FIG. 1(b)) to achieve SNRs ($SNR_{forward}=10 \log(\sigma^2_{forward}/\sigma^2_{added\,noise})$) of 10.0 and 20.0 dB (FIG. 1 (c) and (e)). The method was performed using the Hartley basis set (equation 3) extending from 0 to 10 cycles/$2\pi$. The inverse solutions show good recovery of the original input function, with inverse solution SNRs ($SNR_{inverse}=10 \log(\sigma^2_{true}/\sigma^2_{recovered\,noise})$) of 19.26 dB (FIG. 1 (d)) for the 20 dB forward solution, and 10.33 dB for the 10 dB forward solution (FIG. 1 (f)).

Figure 2:
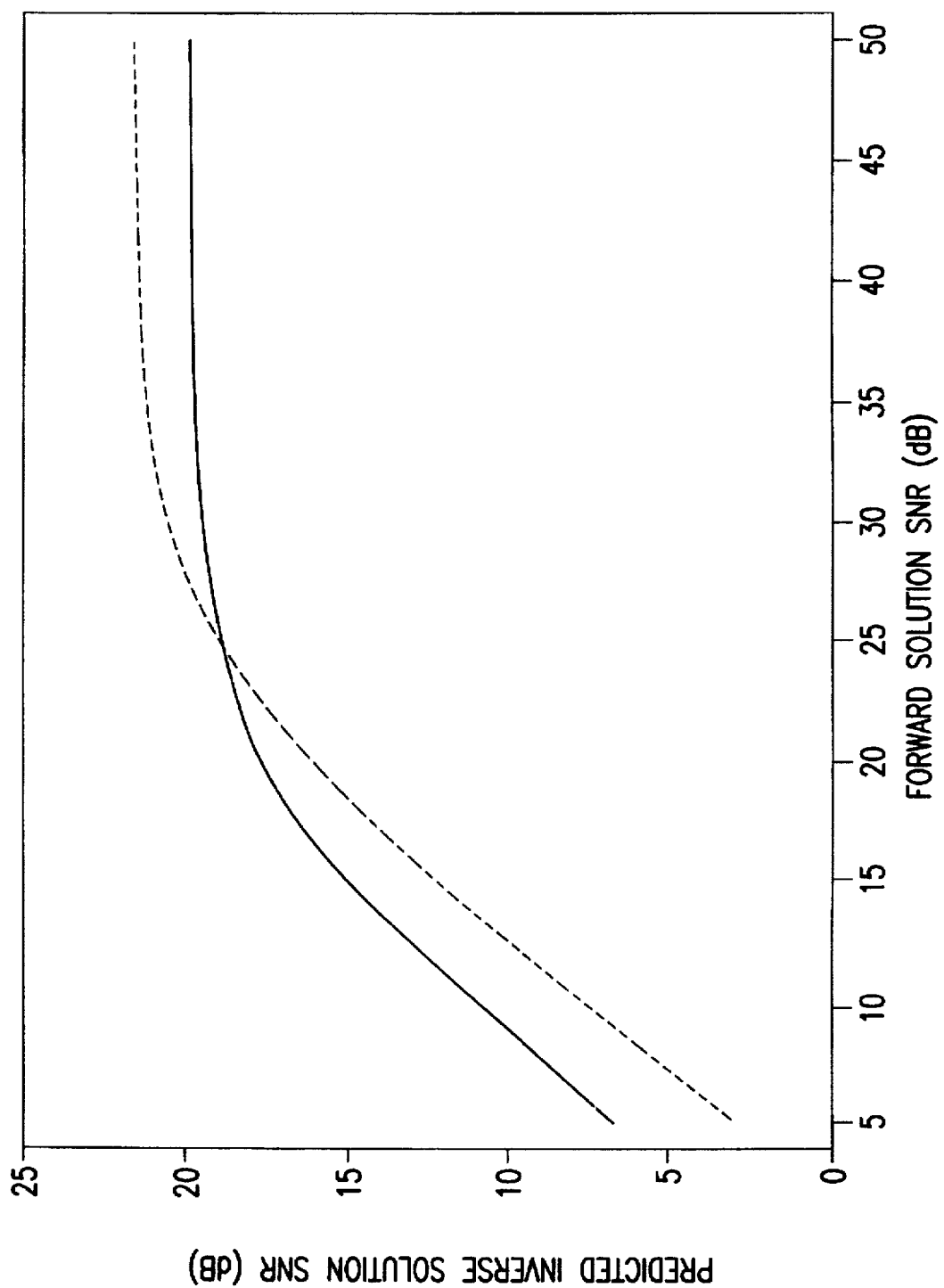
FIG. 2 is a plot of $SNR_{forward}$ vs. $SNR_{pred}$ (equation (13)) for the system. The solid line represents the predicted relationship between forward and inverse solution SNR for the method using a Hartley basis set over 0–10 cycles/$2\pi$. The broken line is for a Hartley basis set extending over 0–14 cycles/$2\pi$. The 0–14 cycles/$2\pi$ basis set provides higher SNR of the inverse solution for high $SNR_{forward}$ due to superior basis representation of the original signal. With lower SNR forward, the broader basis set has greater noise recovery than the more restricted basis set, causing inferior $SNR_{pred}$ for the inverse solution.

It should also be appreciated that using an assumption of zero-mean white noise, and a predetermined value of $|O_{intrinsic}|^2$, a plot of $SNR_{pred}$ vs. $SNR_{forward}$ (see FIG. 2) may be constructed for the system described for Hartley basis function bandwidths of 10 and 14 cycles/$2\pi$. For the 0–10 cycles/$2\pi$ Hartley basis set, the $SNR_{pred}$ values of 11.39 dB and 17.91 dB (for the 10 dB and 20 dB forward solutions respectively) correspond reasonably well with the experimental $SNR_{inverse}$ values of 10.33 dB and 19.26 dB. FIG. 2 illustrates that increasing the recovery bandwidth from 10 to 14 cycles/$2\pi$ results in improved $SNR_{pred}$ when the $SNR_{forward}$ is high, due to the improvement in representation of the inverse solution afforded by a more complete basis set. However, with lower $SNR_{forward}$, the effects of increased noise recovery accompanying expansion of the basis set offsets this advantage and results in lowering the $SNR_{pred}$ of the inverse solution. This method of $SNR_{inv}$ estimation can be performed using training sets of large numbers of simulated signals and noise levels to determine the best selection of basis set for a given application.

The forward solution $I_{\rho k}$ for two-dimensional separable spatially variant point spread function (SSVPSF) systems may be obtained by successive application of column and row degradation operators to the original image $O_{\rho k}$. Obtaining the inverse solution for the SSVPSF system by the present method follows the general approach for matrix operators on separable systems. For each row $\rho=1,2,\ldots,IU$, the blurring matrix across the columns, $[B]_\rho$, is constructed, allowing calculation of the corresponding orthogonal sets $c_{\rho mk}$ and $d_{\rho mk}$ (6). Successive application of the present operational equation (10) to all of the rows yields the IU×IU intermediary matrix $J_{\rho k}$, which has been corrected for the blurring across columns, $$J_{\rho \kappa} = \sum_{m=1}^{M} c_{\rho_{m\kappa}} \left[ \sum_{\kappa=1}^{IU} d_{\rho_{m\kappa}} I_{\rho \kappa} \right] \quad (14)$$

$\rho = 1,2,3,\ldots,IU$.

The present method process is then repeated on each column of the intermediary matrix $J_{\rho k}$ to remove the blurring across rows. For each column, the appropriate blurring matrix $B_k$ is used to determine the $c_{kmp}$ and $d_{kmp}$ orthogonal sets needed for the inverse solution. The resultant matrix $o_{\rho k}$ is the desired two dimensional inverse solution.

$$o_{\rho \kappa} = \sum_{m=1}^{M} c_{\kappa_{mp}} \sum_{\rho=1}^{IU} d_{\kappa_{mp}} J_{\rho \kappa} \quad (15)$$

$\kappa = 1,2,3,\ldots,IU$.

Of course, the above equations (14) and (15) are 2-D restoration equations strictly for the "separable, spatially varying point spread function case. $J_{\rho k}$ is the result of performing 1-D DOBR on all the rows and $o_{\rho k}$ is the result of performing 1-D DOBR on all the columns of $J_{\rho k}$.

It should, also, be appreciated that limitation of the basis set bandwidth is required for stability of the inverse solution in the presence of noise. Noise in the restored image may be due to added noise included in the recovery method, or may result from imperfections in the representation of the image by a limited basis set. The inverse solution for a noisy input is the sum of the output of the method applied separately to signal and noise components. For the two-dimensional separable case, the noise power present in the inverse solution is the noise recovered by successive row and column operations, $$|Noise|_{inv}^2 = \quad (16)$$

$$\left| \sum_{m=1}^{M} C_{\kappa_{mi}} \left( 1/IU \cdot \sum_i D_{\kappa_{mi}} \cdot \left\{ \sum_{m=1}^{M} C_{\rho_{mi}} \left[ 1/IU \cdot \sum_i D_{\rho_{mi}} N^*_{\rho i} \right] \right\} \right) \right|$$

$i = 0, \pm 1, \pm 2, \ldots, \pm(M-1)/2$ $\rho = 1,2,3,\ldots,IU$ $\kappa = 1,2,3,\ldots,IU$, where $C_{mi}$ and $D_{mi}$ are the Fourier transforms of $c_{mk}$ and $d_{mk}$ respectively, and $N_{\rho i}$ is the frequency domain representation of the added noise in each row vector. The frequency domain index i references the discrete frequencies following an IU point FFT. If the frequency domain characteristics of added noise in the forward solution are known, the recovered noise power in the inverse solution may be estimated using equation (16).

Noise in the inverse solution due to limited basis set representation may be significant, particularly if the original image contains high contrast edges. The intrinsic restoration noise for a selected basis set may be estimated by performing the present method on a simulated noiseless forward solution, and determining the error (intrinsic noise) between the restored image and the original image. The total noise in the inverse solution is the sum of this intrinsic noise and the recovered added noise. The predicted SNR of the restored image is $$SNR_{pred} = 10 \log \frac{|O_{true}|^2}{|O_{noise}|^2_{inv} + |O_{intrinsic}|^2} \quad (17)$$

Simulations can be conducted for a given imaging system using different basis set bandwidths at anticipated forward solution SNRs. The predicted values of the inverse solution SNRs may be used to select the basis set bandwidth which is likely to provide the best restoration. Large numbers of simulations with training sets of images and noise levels appropriate to the application can be used to determine the optimal basis set for a particular application.

The following example is presented for purposes of further illustrating the present invention, but it is not to be considered as limited thereto.

EXAMPLE 2

Figure 3:
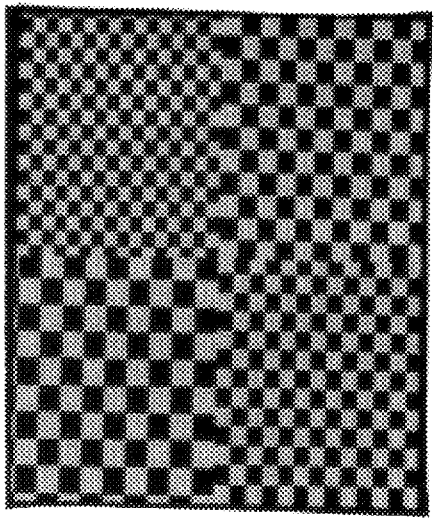
FIG. 3 is a photograph of an original image of a four quadrant checkerboard with square sizes of four, five, six and seven pixels.

A 128×128 pixel four quadrant checkerboard pattern with quadrant check sizes of 4,5,6,and 7 pixels (see photographic FIG. 3) was chosen for illustration of the present method in restoring a SSVPSF system. The light squares were assigned a value of 1.0 and the dark squares 0.3. The multiple high-contrast discontinuities in this image were designed to be particularly challenging for a restoration method using a bandlimited basis set. The spatially varying gaussian transfer function had exponentially-radially varying FWHM of 6 pixels in the image center and FWHM of 3 pixels at the image corners. The PSF located at the center of the image space was assigned an amplitude so that the center PSF was lossless. PSF amplitude declined radially in exponential fashion so that the PSF amplitude in the corners was half of the center PSF amplitude.

Figure 4:
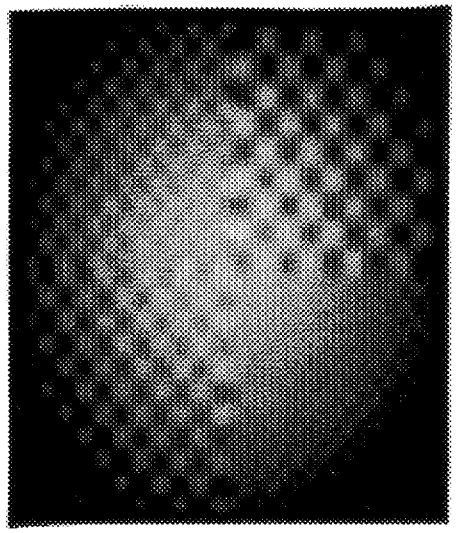
FIG. 4 is a photograph of the forward solution showing severe distortion following degradation by a system with gaussian separable spatially variant point spread function (SSVPSF) that varied radially in width (center FWHM=6 pixels, corner FWHM=3 pixels) and amplitude (center= 0.151, corner=0.075), and addition of noise to achieve SNR=20 dB.
Figure 5:
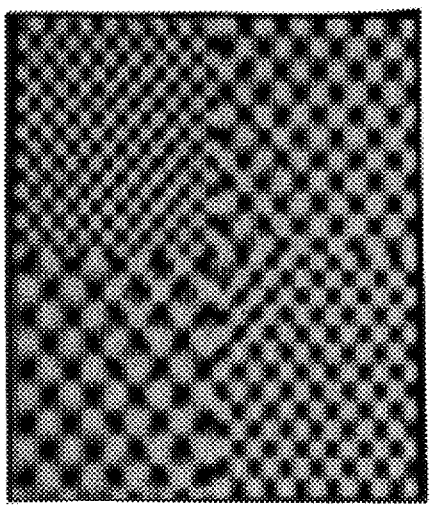
FIG. 5 photographically shows the restored image following application of the present method to achieve resolution of all image elements with good contrast recovery.
Figure 6:
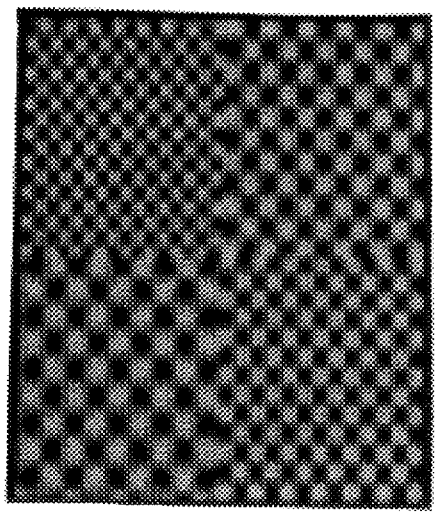
FIG. 6 photographically demonstrates the added noise in the restored image when the original image is processed in accordance with the present method from a noiseless forward solution.

Based on the methods described above, the Hartley basis set utilized was restricted to +/− 18 cycles/2π to assure a stable restoration for an anticipated forward solution SNR of 20 dB. Zero-mean pseudorandom noise was added to the forward solution to achieve a SNR of 20 dB (see photographic FIG. 4). The restored image (see photographic FIG. 5) from this noisy forward solution showed good contrast recovery with resolution of all image elements. Due to the presence of method recovered noise the subjective quality is inferior to the noiseless restoration shown in photographic FIG. 6, which is subject only to intrinsic noise, but is a dramatic improvement from the degraded image shown in photographic FIG. 4.

The alternative embodiment described extends directly to two or more dimensions provided that it is cast in "stacked lexicographic" format e.g. A 2×2 image is acted on by a degrading operator to yield a forward solution 2×2 image;

| 1 | 2 |     | A | B |
|---|---|     |---|---|
| 3 | 4 | ⇒   | C | D | in stacked lexicographic notation this may be cast as the one dimensional problem $$\begin{bmatrix} 4 \times 4 \\ \text{operator} \end{bmatrix} \begin{bmatrix} 1 \\ 2 \\ 3 \\ 4 \end{bmatrix} = \begin{bmatrix} A \\ B \\ C \\ D \end{bmatrix}.$$

This is a common approach in image processing to reduce multidimensional problems to 1-D problems.

As should be appreciated, the above described method for discrete orthogonal basis restoration (DOBR) is a time-domain approach. In an alternative embodiment of the present invention, discrete orthogonal basis restoration is presented as a frequency domain approach for the estimation of the inverse solution vector for linear systems defined by the matrix operation $$[B][o]=[i]$$

where [B] is an N×N non-singular transfer function matrix and [o] and [i] are length N column and row vectors. In this alternative embodiment, upper case letters denote frequency domain variables while lower case letters denote time-domain variables. For vector sets with two subscripts, such as $C_{mk}$, the first denotes the set position and the second the discrete time or frequency index.

The normalized Hartley basis set is preferred for this alternative approach of discrete orthogonal basis restoration. The Fourier representation of a Hartley basis vector of frequency $f_n$ cycles/2π is non zero only at the ± $f_n$ discrete frequencies. All positive frequency Hartley basis vectors have identical complex amplitude $$\frac{\sqrt{N}}{2}, -\frac{\sqrt{N}}{2}$$

in their non-zero positive frequency bin, and the complex conjugate of this value in the negative frequency bin. Negative frequency Hartley basis vectors are the complex conjugates of the positive frequency spectrum. These relationships facilitate rapid computation and efficient storage of the basis set. The members of the frequency domain basis set, $P_{mk}$, are ordered such that the DC component is assigned index m=1, even values of the basis set index m correspond to positive Hartley frequency f=/2 and odd values of m correspond to the f=−(m−1)/2 Hartley frequency. For a selected DOBR bandlimit of 0−$f_{max}$ cycles/2π, there are M=(2·fmax)+1 basis and vectors, so that the composite basis set spectrum is non-zero for m=1, . . . , ($f_{max}$+1) and (N−M+1), . . . , N. The relative compactness of the frequency domain representation of the basis set is instrumental in the development of an efficient frequency domain approach.

The initial step in the time-domain approach is the application of the adjoint (complex conjugate transpose) of the transfer function [B] to each member of the orthogonal basis set $P_{mk}$ to yield the vector set $b_{mk}$. For the time varying case, the M frequency domain row vectors $A_{mk}$ may be determined by $[F]^{T*}[P]_m=[A]_m$, where the N×N matrix $[F]^{T*}=[DFT][B]^{T*}[IDFT]$, and [DFT] and [IDFT] are the discrete and inverse discrete Fourier transform matrices. Using the properties $[F]=[[F]^{T*}]^{T*}$ and $[DFT]=k[IDFT]^{T*}$, it follows that $[F]=[DFT][B][IDFT]$, and noted that the spectrum of the forward solution is given by $$\sum_n F_{kn}O_n = I_k. \tag{18}$$

For non-singular [B] the vector set $A_{mk}$ is linearly independent, but usually not orthogonal. Gram-Schmidt orthogonalization can be performed on the frequency domain vector set $A_{mk}$ to yield an orthogonal complex set $C_{mk}$. Regrouping the complex Gram-Schmidt coefficients $a_{mi}$ $$a_{mi} = \frac{\sum_{k=1}^{N} C_{mk} A^*_{ik}}{\sum_{k=1}^{N} C_{mk} C^*_{mk}} \tag{19}$$

$$i = 1, \ldots, m-1$$

$$m = 1, \ldots, M,$$

into a set of constants τ defined by $$\tau_{mi} = \frac{1.0}{\sqrt{\sum_{k=1}^{N} C_{mk} C^*_{mk}}} \tag{20}$$

-continued $$m = i$$

$$\tau_{mi} = \frac{1.0}{\sum\limits_{k=1}^{N} C_{mk}C^*_{mk}} \sum\limits_{j=1}^{m-1} a_{mj}\tau_{ji} \qquad (21)$$

$$i = 1, \ldots, m-1$$

$$m = 1, \ldots, M$$

allows the orthonormal vector set $C_{mk}$ to be expressed as a superposition of prior $A_{ik}$ by $$C_{mk} = \sum\limits_{i=1}^{m} \tau_{mi}A_{ik} \qquad (22)$$

A second complex vector set $D_{mk}$ is obtained by applying the same operation to the orthogonal basis set $P_{ik}$.

$$D_{mk} = \sum\limits_{i=1}^{m} \tau_{mi}P_{ik} \qquad (23)$$

The vector sets $C_{mk}$ and $D_{mk}$ define the characteristics of the system [B] for frequency domain DOBR.

In the frequency domain, the completeness relationship [24] for orthonormal vectors may be written as:

$$O_k = \frac{1}{N} \sum\limits_{m=1}^{M} C_{mk} \sum\limits_{n=1}^{N} C^*_{mn}O_n. \qquad (24)$$

Transferring the complex conjugation to $O_n$, substituting (22) and using the relationship $[F]^{T*}[P]_m = [A]_m$, yields $$O_k = \sum\limits_{m=1}^{M} C_{mk} \frac{1}{N} \sum\limits_{n=1}^{N} \sum\limits_{i=1}^{m} \tau_{mi} \sum\limits_{k=1}^{N} F^{T*}_{nk}P_{ik}O^*_n. \qquad (25)$$

which by the property of adjoint operators on inner product spaces [25] is equivalent to $$O_k = \sum\limits_{m=1}^{M} C_{mk} \frac{1}{N} \sum\limits_{k=1}^{N} \sum\limits_{i=1}^{m} \tau_{mi}P_{ik} \sum\limits_{n=1}^{N} F_{kn}O^*_n. \qquad (26)$$

Reference to (18) and (23) yields the frequency domain DOBR operational equation $$O_k = \sum\limits_{m=1}^{M} C_{mk} \frac{1}{N} \sum\limits_{k=1}^{N} D_{mk}I^*_k \qquad (25)$$

$O_k$ is the spectral estimate of the inverse solution. The time domain inverse solution $O_k$ may be obtained by inverse FFT of $O_k$.

The steps where major computational differences exist between the time and frequency domain approaches involve summations that may be limited to regions of time or frequency domain support. In the frequency domain approach the range of summation is restricted to the M discrete frequencies where the composite basis set spectrum in non-zero. The frequency domain DOBR approach saves (N–M) multiplications and additions for each of the many inner products required by the approach. The reduction in the number of computations is at the expense of substituting complex for real operations. This is not particularly disadvantageous for additions, as current generation microprocessors perform complex and real additions with an equivalent number of clock cycles. Complex multiplications are more time consuming than real multiplications, but for practical DOBR applications the reduction in computations offsets the increased processor time.

The initial step in the frequency domain approach is the determination of $A_{mk}$. When [B] is time varying, $A_m$ may be estimated by $[DFT][B]^{T*}[IDFT][P]_m$, but this is less efficient than calculating the time domain $[b]_m = [B]^{T*}[p]_m$, and subsequently performing an N point FFT on each vector $[b]_m$. Using this approach, an additional $M(N\log_2 N)$ complex additions and $M(N/2\log_2 N)$ complex multiplications are required for the frequency domain approach. Determining $C_{mk}$ by Gram-Schmidt orthogonalization requires calculation of $NC = (M^2 - M)/2$ coefficients, for which the computational advantage of the frequency domain approach is $2NC(N-N)$ multiplications and additions. Performing the linear combinations of vectors weighted by these coefficients yields computational savings of $NC(N-M)$ multiplications and $(N-M)(M+NC-1)$ additions for the frequency domain approach. Normalization of the $C_{mk}$ has savings of $M(N-M)$ multiplications compared to the time-domain approach. The sparsity of the vectors $P_{mk}$, which are non-zero at only two discrete frequencies for $m>1$, and at one frequency (DC) for $m=1$, allow rapid frequency domain computation of the set $D_{mk}$. The computational advantage of the frequency domain approach is $(M+NC)(N-2)$ additions and multiplications for the determination of $D_{mk}$.

Practical situations usually involve applying the DOBR operational equation for a stationary system [B] to multiple forward solutions. The vector sets $C_{mk}$ and $D_{mk}$, define the DOBR inverse system for [B], and may be computed, stored, and recalled for each implementation of the operational equation. Storage requirements are $2M^2$ complex numbers for the frequency domain approach and $2(MN)$ real numbers for the time-domain approach, so that a reduction in storage requirements is realized when $M<N/2$. The total operational equation computational advantage for the frequency domain approach is $2M(N-M)$ multiplications and additions, which is reduced by $N\log_2 N$ additions and $N/2\log_2 N$ multiplications if the FFT of $i_k$ to yield $I_k$ is required. If the spectral estimate of the inverse solution is desired, the approach may be terminated at this point. Obtaining the time-domain solution by inverse FFT of $O_k$, requires an additional $N\log_2 N$ complex additions $N/2\log_2 N$ complex multiplications, and N real multiplications.

An additional advantage of the frequency domain approach is that it is more robust when there are significant perturbations in [B]. Errors in transfer function estimation are normally transmitted to the $b_{mk}$ and ultimately have adverse effects on the inverse solution [21]. In the frequency domain approach, the noise components in [B] transmitted to $A_{mk}$ lying outside of the DOBR bandwidth are not included in the calculations of $C_{mk}$, and therefore are not propagated to the final solution. The inverse solution obtained from the frequency domain approach may be expected to be of higher quality than would be obtained from the time domain approach, especially when large errors in the estimation of [B] are present.

EXAMPLE 3

Consider an application with a time duration signal of N=128 samples and a DOBR basis set bandwidth of 0–10-cycles/$2\pi$, requiring M=21 Hartley basis vectors. For a previously defined stationary system, DOBR is performed by executing the operational equation (27) with stored values of $C_{mk}$ and $D_{mk}$. The time domain operational equation requires 5376 real multiplications and 5334 real additions. The frequency domain operational equation, including the FFT of $i_k$ and IFFT of $O_k$, requires 1778 complex multiplications, 1736 complex additions, and 128 real multiplications, a reduction by a factor of 2.9 in the number of operational equation computations.

Dynamic systems, and initial applications of the frequency domain approach require computation of $C_{mk}$ and $D_{mk}$ and achieve all of the computational savings described above. Despite the computational debt established by (M+2) N-point FFT's, significant computational savings are realized by the frequency domain approach. For the example case of N=128 and M=21, the net savings are 82542 additions and 92825 multiplications. This reduces the number of operations performed after computation of the vector set $b_{mk}$ by a factor of 3.9 when compared to the time-domain approach. The computation of $b_{mk}$ common to both the time and frequency domain approach, is very computationally demanding, requiring $MN^2$ multiplications and $M(N^2-N)$ additions.

It should be clear that DOBR is a robust method of inverse solution for time-varying or time-invariant linear systems expressed as a square matrix operator. The frequency domain approach exploits the compactness of frequency domain support exhibited by the DOBR vector sets to reduce the range of most summations from the N points of the time-domain signal to the M complex values of the frequency domain DOBR bandwidth. Frequency domain DOBR is used to greatest advantage when system stationarity allows repeated implementations of the operational equation with predetermined vector sets $C_{mk}$ and $D_{mk}$, but also offers improvements in computational efficiency when the entire approach must be executed. The frequency domain DOBR approach significantly reduces the storage requirements and the number of arithmetic computations for DOBR, as well as lessening the deleterious effects of transfer function perturbations of the inverse solution.

Whether the original or alternative embodiment of discrete orthogonal basis restoration is utilized, it has been found that the present method possesses advantages over other prior art methods when there is noise in the system transfer function [B]. More specifically, the present discrete orthogonal basis restoration method may be utilized to assess the effects that observed noise in the transfer function and the forward solution have on the error in the inverse solution estimate. It is assumed that there is no transmission of noise by the system and that the observed noise in the forward solution and transfer function are mutually independent.

In the presence of perturbations, the linear system [B][o] =[i], becomes $$[B+N][o']=[i]+[i_N], \quad (28)$$

where [N] is additive transfer function noise, $[i_N]$ is additive forward solution noise, and [o'] is the estimated inverse solution for the perturbed system.

For the system perturbed only by noise in the forward solution $[B][o]=[i]+[i_N]$, the DOBR inverse solution is the superposition of DOBR solutions for the signal and noise components, which in the frequency domain is $$O'_k = \sum_{m=1}^{M} C_{mk} \frac{1}{NP} \sum_{k=1}^{NP} D_{mk}I^* signal_{mk} + \sum_{m=1}^{M} C_{mk} \frac{1}{NP} \sum_{k=1}^{NP} D_{mk}I^* N_{mk} \quad (29)$$

where NP is the number of discrete frequencies used in frequency domain DOBR.

The signal to noise ratio of the inverse solution in the presence of forward solution noise may be estimated by $$SNR_{inverse} = 10 \log \frac{|O_{true}|^2}{|N_{intrinsic}|^2 + |N_{fwd}|^2} \quad (30)$$

where $|O_{true}|^2$ is the true inverse solution power, $|N_{intrinsic}|^2$ is intrinsic noise resulting from error in estimation of the inverse solution with a limited basis set, and $|N_{fwd}|^2$ is the DOBR inverse solution of the forward solution noise component (right hand term in (11)).

Unlike forward solution noise, transfer function perturbations change the characteristics of the vector sets $c_{mk}$ and $d_{mk}$, which define the behavior of the DOBR operational equation. Application of the perturbed transfer function [B+N] to each member of the basis set $p_m$, yields $$[B+N][p]_m = [b]_m + [b_N]_m = [b']_m \quad (31)$$

As was the case with forward solution noise, it is beneficial to analyze the effects of transfer function noise in the frequency domain. For the time invariant (convolution) case the calculation of $A_m$ reduces to the point by point multiplication of the Fourier transform of the transfer function and $P_m$. When [B] is a time-varying system, the spectral estimation of $A_m$ is considerably more complex. In the noiseless case, the spectra $A_m$ may be represented by $A_m = [DFT][B]^{T*}[IDFT][P]_m$ where [DFT] and [IDFT] are the NP×NP discrete Fourier transform and inverse discrete Fourier transform matrices, and $[P]_m$ is the 1×NP column vector frequency domain representation of the mth basis function [8]. In the presence of transfer function noise, $A'_m$ may be estimated by:

$$A'_m = [DFT][B+N]^{T*}[IDFT][P]_m \quad (32)$$

$$A'_m = [DFT][B]^{T*}[IDFT][P]_m + [DFT][N]^{T*}[IDFT][P]_m \quad (33)$$

$$A'_m = A_m + A_{Nm} \quad (34)$$

The resultant noise in $A'_m$ is therefore the superposition of $A_m$ and $A_{Nm}$.

Figure 7:
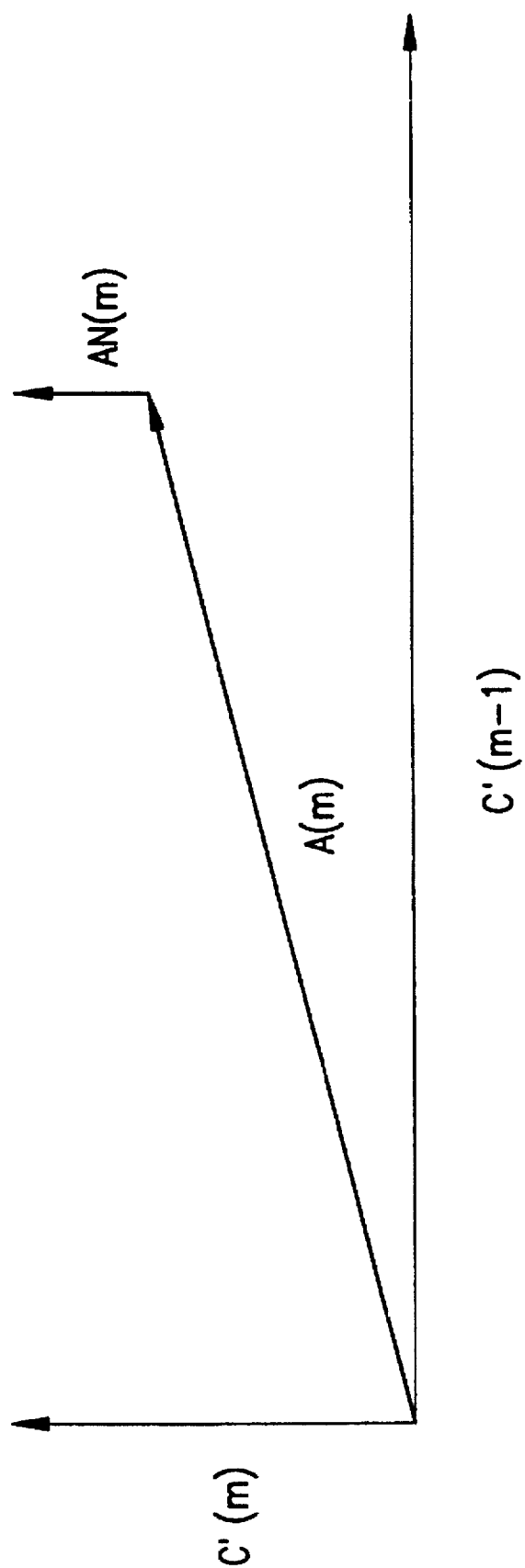
FIG. 7 is a two dimensional representation of the Gram-Schmidt orthogonalization process in the presence of noise.

The worst-case scenario will be considered in evaluating the propagation of noise in the frequency domain Gram-Schmidt orthogonalization process. Maximal noise transmission occurs when each $A_{Nm}$ is orthogonal to $C'_{m-1}$ (FIG. 7), and therefore has complete projection onto the vector $C'_m$. The Gram-Schmidt coefficients involving the inner products of $A_{Nm}$ and prior $C'_m$ are zero by virtue of orthogonality, greatly simplifying the computational process. Each $C'_m$ is then formed from $A_m + A_{Nm}$ minus the projections of $A_m$ on prior $C'_m$.

$$C_1 = A'_1 = A_{N1} + A_1 \quad (35)$$

$$C_2 = A_2 + A_{N2} - \frac{<A^*_2|C_1>}{\|C_1\|^2} \quad (36)$$

$$C_m = A_m + A_{Nm} - \sum_{j=1}^{m-1} \frac{<A^*_m|C_j>}{\|C_j\|^2} \quad (37)$$

Each $C'_m$ is subsequently normalized, which preserves the relative noise contribution to $C'_m$, but depending on the amplification properties of the transfer function [B], the normalization may either increase or decrease the magnitude of noise transmitted to $C'_m$. For the worst case scenario the total transmitted noise to $C'_m$ is $$|N_c| = A_{N1} + \sum_{m=2}^{M} \frac{A_{Nm}}{\|C_{m-1}\|^2} \quad (38)$$

The frequency domain Gram-Schmidt orthogonalization constants $$o_{mj} = \frac{<C^*_j|A'_m>}{\|C_j\|}$$

can be regrouped and normalized into the set of constants $\phi_{mj}$ so that each $C'_m$ is expressed as a linear combination of A'$_i$ (39). The D'$_m$ is then calculated using the same set of constants φ$_{mi}$ (40).

$$C_{mk} = \sum_{i=1}^{m} \phi_{mi} A'_{ik} \quad (39)$$

$$D'_{mk} = \sum_{i=1}^{m} \phi_{mi} P'_{ik} \quad (40)$$

The frequency domain operational equation in the presence of transfer function noise is $$O'_k = \sum_{m=1}^{M} C_{mk} \frac{1}{NP} \sum_{k=1}^{NP} D'_{mk} I^*_k \quad (41)$$

The vector set D'$_m$ is constructed to be compatible with the set C'$_m$ and does not contribute additional noise to the inverse solution. The worst case inverse solution SNR due to transfer function perturbations may be estimated by $$SNR_{inv} = 10 \log \frac{|O_{true}|^2}{|N_{intrinsic}|^2 + |N_c|^2} \quad (42)$$

In practice, transfer function perturbations do not fulfill the worst case orthogonality criteria, and the separation of signal and noise components in the Gram-Schmidt process becomes an unwieldy and impractical approach for SNR$_{inv}$ estimation. The practical consequences of perturbations are their impact on basis set selection, and the quality of inverse solution obtained. A satisfactory method for addressing both of these parameters is to perform simulation studies on a large training set with representative signals and noise at different DOBR basis set band widths to determine the optimal basis set for the given application.

In order to still further explain the present invention, attached hereto as Appendixes A–C are source code listings for completing, respectively, time domain DOBR for shift-invariant functions (deconvolution) (Appendix A); time domain DOBR for general time-varying transfer functions (Appendix B); and frequency domain DOBR (Appendix C).

In summary, the method of the present invention is equally applicable and extends to both one dimensional and two dimensional signal and image systems. The chief advantage of the present method compared to other SSVPSF restoration techniques are that preprocessing, matrix inversion, multiple iterations, or assumptions of local PSF variance are not required. As a result, processing times and computer power required for processing are both substantially reduced.

The primary limitation of the present method is that the basis function support of the inverse solution must be nearly congruent to the region of basis support of the transfer function to avoid an unstable inverse solution. Provided that a realistic simulation model exists, however, estimation of the restored image SNR may be made for a given forward solution SNR and chosen basis set. This allows a priori determination of the optimal basis set for a given application and provides an estimate of the anticipated quality of the restored image.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

APPENDIX A

```fortran
c   harpat.for
c..performs discrete orthogonal basis restoration for invariant
c..systems
c.. using Hartley basis set
c...calls:mat hart inprod
c::::::::::::::::::::::::::::::::::::::::
c::::::::::::::::variables:::::::::::::::
c      izz is the maximum number of basis functions
c      iu is the length of the fwd soln vector (ri) and inv. soln
c      vector (h)
c      the basis set is determined and placed in poly
c      the basis set used for the inv soln is ordered transferred
c      to rleg
c      gau is the matrix formulation of the transfer function
c      vector g,
c          and gt is it's transpose. Note that gau and gt are cast
c      for
c          row*square matrix=row vector fwd soln
c      The gram-schmidt coef are stored in matrix a
c      The tau coef are in tau
c      The vector sets b,c,d with m members correspond to the
c      literature
c          descriptions. f(m) are <d(m),i> and are intermediate
c      step
c      the inverse soln is h
c      npol is the number of basis vectors used
c      the array cnorm holds the normalization factors for each
c          member of the vector set c implicit integer(i-o)
            parameter(izz=65,iu=128,twopi=6.283185)
        common/c1/delt,rip
        common/c2/rp1(iu),rp2(iu)
        common/c4/poly(0:izz,iu)
        common/c5/iz
        common/c6/gau(iu),gt(iu,iu)
        common/c6a/g(iu,((2*iu)-1))
        common/c11/rphas
        real b(izz,iu),c(izz,iu),d(izz,iu)
        real a(izz,izz),tau(izz,izz)
        real rleg(0:izz,iu)
        real f(izz),h(iu),cnorm(izz)
            real ri(iu),sumc(iu)
            integer ifini
            integer npol
        character*13 pre
            character*4 suf3,suf2
            character*10 filen,fileg,flh,taunm,obas
            character*30 taunmx,obasx
            character*30 filex,filegx,filein,fileh
            character*2 ntrial
            character*1 cxans,cyans
```

```
      pre='c:\fort\data\'
        suf2='.dec'
      suf3='.hdc'
c.......compute Hartley Basis Set
        iz=64
                write(6,*)'%%%%%calling hart%%%%% '
                call hart c.... normalization of basis
c
        do 820 m=0,iz
      do 812 kkk=1,iu
            rp1(kkk)=poly(m,kkk)
812         rp2(kkk)=poly(m,kkk)
      call inprod
      do 815 kkk=1,iu
            poly(m,kkk)=(poly(m,kkk))/(sqrt(rip))
815   continue
820   continue c....read in the ideal image and the PSF
      write(6,*)' input name for header file xxxxxx.xxx   '
      read(5,933)flh
      fileh=pre//flh
      open(25,file=fileh,status='new')
        write(6,*)' input filename of PSF xxxxxx.xxx '
        read(5,933)fileg
        filegx=pre//fileg
        igau=0
        open(20,file=filegx,status='old')

do 43 i=1,iu
        read(20,*,end=433)gau(i)
        igau=igau+1
43      continue
433     close(20)
933     format(a10)
        write(6,*)' input trial number for this input fn '
        read(5,964)ntrial
964     format (a2)
        write(6,*)' input filename of fwd soln xxxxxx.xxx '
        read(5,933)filen
c... set the restoration bandwidth
        write(6,*)' high freq c/o '
        read(5,*)ifini npol=(2*ifini)+1 c!!!!!!!!!!!!!!build the selected orthogonal set!!!!!!!!
c...always include the dc component
        do 24 ii=1,iu
24          rleg(1,ii)=poly(0,ii)
```

```
              iptr=0
              do 25 j=1,ifini
        iptr=iptr+2
        jind=(j*2)-1
              do 22 ii=1,iu
                        rleg(iptr,ii)=poly(jind,ii)

rleg(iptr+1,ii)=poly(jind+1,ii)
22            continue
25      continue write(6,*)'$$$$$$$ orthonomal setup done $$$$$$$'
c@@@@@@@@@@@@@@@@@@@@@
c:::::::::::::::::::::::::::::::::::::::::::::::::::::

c..compensate for extra loop trip and truncate to odd #
      igau=igau-1
         figau=float(igau)
      fig2=figau/2.
      ifig2=igau/2
      fif=float(ifig2)
      if(fig2.eq.fif)then
         igau=igau-1
      endif
c...call mat to cast the convolution operator in matrix form
c... note that this is in row vector format call mat(igau)

c>>>>>>>>>>calc b(k) using matrix approach>>>>>>>>>>>>>>>>>>>>>>>>>
     write(6,*)'......calculating b(k)......'
c****use transpose matrix
         iz=(2*ifini)+1
         do 10 k=1,iz
      do 9 ic=1,iu
      sum=0.
      do 8 ir=1,iu
           sum=sum+(rleg(k,ir)*gt(ir,ic))
8     continue
      b(k,ic)=sum
9     continue
10    continue
c>>>>>>>>>>>>>>>>>>>>>>>>>>>>>>>>>>>>>>>>>>>>>>>>>>>>>>>>
c?????????calc c(k)s??????????????????????????????????????
     write(6,*)'++++++calculating c(k)++++++'
     do 21 kkk=1,iu
21   c(1,kkk)=b(1,kkk)
     do 23 m=1,iz
23   a(m,m)=1.
c......calculate Gram-Schmidt coefficients
     do 50 m=2,iz
```

```
          do 40 j=1,m-1
          do 30 kkk=1,iu
             rp1(kkk)=c(j,kkk)
30           rp2(kkk)=rp1(kkk)
          call inprod
          rnorm=rip do 29 kkk=1,iu
             rp1(kkk)=c(j,kkk)
29           rp2(kkk)=b(m,kkk)
          call inprod a(m,j)=-1.*(rip/rnorm)

40    continue c....now calculate c(m) by G-S orthogonalization
          do 46 ii=1,iu
46    sumc(ii)=0.

do 49 j=1,m-1
          do 48 kkk=1,iu
             sumc(kkk)=sumc(kkk)+(a(m,j)*c(j,kkk))
48    continue
49    continue
          do 47 kkk=1,iu
             c(m,kkk)=b(m,kkk)+sumc(kkk)
47    continue
50    continue c????????????????????????????????????????????????????????????
c....normalization
      do 720 m=1,iz
      do 712 kkk=1,iu
         rp1(kkk)=c(m,kkk)
712      rp2(kkk)=c(m,kkk)
      call inprod
      cnorm(m)=sqrt(rip)
      do 715 kkk=1,iu
         c(m,kkk)=(c(m,kkk))/(sqrt(rip))
715   continue
720   continue
c^^^^^^^^^^^^^^calculate taus^^^^^^^^^^^^^^^^^^^^^
         write(6,*)'======calculating tau======'
      do 75 k=1,iz
75    tau(k,k)=a(k,k)
      do 90 m=2,iz
      do 85 i=1,m-1
      if(i.ne.m)then
         rsum=0.
      do 83 j=i,m-1
         rsum=rsum+(a(m,j)*tau(j,i))
83    continue
      tau(m,i)=rsum
```

```
          else
          endif
85     continue
90     continue
c  normalize taus by dividing by cnorms
       do 94 m=1,iz
       do 92 i=1,iz
       tau(m,i)=(tau(m,i)/cnorm(m))
92     continue
94     continue
c^^^^^^^^^^^^^^^^^^^^^^^^^^^^^^^^^^^^^^^^^^^^^^^
c!!!!!!!!!!!!!!!!!!!!calculate d(iz,iu)!!!!!!!!!!!!!!!
       write(6,*)'!!!!!!!calculating d(iz,iu)!!!!!!!'
       do 110 m=1,iz
       do 105 i=1,m
       do 100 it=1,iu
           d(m,it)=d(m,it)+(tau(m,i)*rleg(i,it))
100    continue
105    continue
110    continue
c!!!!!!!!!!!!!!!!!!!!!!!!!!!!!!!!!!!!!!!!!!!!!!!!!!!!!!
c|||||||||||||||||||||||||||||||||||||
       filex=pre//'d'//ntrial//filen(5:6)
   *       //fileg(5:6)//suf2
       fileh=pre//ntrial//filen(5:6)
   *       //fileg(5:6)//suf3
       filein=pre//filen(1:10)
       filegx=pre//fileg(1:10)
c::::::::::::::::::::::::::::::::::::::::::::::::

c::::::::::::::::::::::::::::::::::::::::::::::::::
       open(19,file=filein,status='old')
       do 32 i=1,iu
       read(19,*,end=519)ri(i)
32     continue
519    close(19)

izk=npol
c...clear arrays
       do 190 iy=1,izk
190    f(iy)=0.
       do 191 iy=1,iu
191    h(iy)=0.
c##############compute fs#########################
       do 120 m=1,izk
    rsum=0.
    do 115 i=1,iu
           rsum=rsum+(d(m,i)*ri(i))
115    continue
       f(m)=rsum
     write(6,*)m,'c(m)= ',f(m)
120    continue
```

```
c#################################################
c$$$$$$$$$$$$$$$$calculate h$$$$$$$$$$$$$$$$$$
      do 140 i=1,iu
      rsum=0.
              do 130 m=1,izk
          rsum=rsum+(c(m,i)*f(m))
130   continue
      h(i)=rsum
140   continue
c$$$$$$$$$$$$$$$$$$$$$$$$$$$$$$$$$$$$$$$$$$$$$$
      open(18,file=filex,status='new')
      do 150 i=1,iu
150      write(18,*)h(i)
      close(18)

777   continue
      write(6,*)filex
c??????????????????????????????????????
      write(25,*)'iu= ',iu
      close(25)
c!!!!!!!!!!!
c>>>>>>>>>>>>>>>>>>>>>>>>>>>>>>>>>>>>>>>>
c::::::::::this section allows various process vectors and
matrices to
c::::::::: be saved to disk for later analysis write(6,*)' write taufile (y/n)? '
         read(5,976)cxans
976      format(a1)
         if(cxans.eq.'y')then
         write(6,*)' enter name of taufile '
         read(5,977)taunm
977      format(a10)
         taunmx=pre//taunm
         open(27,file=taunmx,status='new')
         write(6,*)'iz= ',iz
         do 833 m=1,iz
         do 833 i=1,iz
         write(27,*)tau(m,i)
833      continue
         close(27)
         endif
888      write(6,*)' save to disk d(m) array ? '
         read(5,916)cyans
916      format(a1)
         if(cyans.eq.'y')then
556      write(6,*)' # rows= ',iz
         write(6,*)' input name of otpt file xxxxxx.xxx '
         read(5,933)obas
         obasx=pre//obas
         open(30,file=obasx,status='new')
         do 501 ibas=1,iz
```

```
            do 501 ku=1,iu
501     write(30,*)d(ibas,ku)
        close(30)
        endif
        write(6,*)' save to disk c(m) array ? '
        read(5,916)cyans
        if(cyans.eq.'y')then
        write(6,*)' input name of otpt file xxxxxx.xxx '
        read(5,933)obas
        obasx=pre//obas
        open(30,file=obasx,status='new')
        do 503 ibas=1,iz
        do 503 ku=1,iu
503     write(30,*)c(ibas,ku)
        close(30)
        endif
        write(6,*)' save to disk b(m) array ? '
        read(5,916)cyans
        if(cyans.eq.'y')then
        write(6,*)'iz=',iz
        write(6,*)' input name of otpt file xxxxxx.xxx '
        read(5,933)obas
        obasx=pre//obas
        open(31,file=obasx,status='new')
        do 504 ibas=1,iz
        do 504 ku=1,iu
504     write(31,*)b(ibas,ku)
        close(31)
        endif write(6,*)' save g-T ? '
        read(5,916)cyans
        if(cyans.eq.'y')then
        write(6,*)' input name of otpt file xxxxxx.xxx '
        read(5,933)obas
        obasx=pre//obas
        open(30,file=obasx,status='new')
        do 506 ibas=1,iu
506     write(30,*)(gt(ibas,ku),ku=1,iu)
        close(30)
        endif c>>>>>>>>>>>>>>>>>>>>>>>>>>>>>>>>>>>>>>>>>>>
        stop
        end
```

*APPENDIX B*

```fortran
c   tvpat.for
c..performs discrete orthogonal basis restoration for invariant
c..systems
c.. using Hartley basis set
c...calls:hart inprod
c::::::::::::::::::::::::::::::::::::::::::::::
c:::::::::::::::::variables:::::::::::::::::
c     izz is the maximum number of basis functions
c     iu is the length of the fwd soln vector (ri) and inv. soln
c     vector (h)
c     the basis set is determined and placed in poly
c     the basis set used for the inv soln is ordered transferred
c     to rleg
c     tvtfm is the imported matrix  transfer function
c     The gram-schmidt coef are stored in matrix a
c     The tau coef are in tau
c     The vector sets b,c,d with m members correspond to the
c     literature
c        descriptions. f(m) are <d(m),i> and are  an
c     intermediate step
c     the inverse soln is h
c     npol is the number of basis vectors used
c     the array cnorm holds the normalization factors for each
c         member of the vector set c implicit integer(i-o)
         parameter(izz=65,iu=128,twopi=6.283185)
      common/c1/delt,rip
      common/c2/rp1(iu),rp2(iu)
      common/c4/poly(0:izz,iu)
      common/c5/iz
         common/c6a/g(iu,((2*iu)-1))
      common/c11/rphas
      real b(izz,iu),c(izz,iu),d(izz,iu)
      real a(izz,izz),tau(izz,izz)
      real rleg(0:izz,iu)
      real f(izz),h(iu),cnorm(izz)
         real ri(iu),sumc(iu)
         real tvtfm(iu,iu)
         integer ifini
         integer npol
      character*13 pre
         character*4 suf3,suf2
         character*10 filen,fileg,flh,taunm,obas
         character*30 taunmx,obasx
         character*30 filex,filegx,filein,fileh
         character*2 ntrial
         character*1 cxans,cyans
      pre='c:\fort\data\'
         suf2='.dec'
```

1

```
      suf3='.hdc'
c.......compute Hartley Basis Set
      iz=64
              write(6,*)'%%%%%calling hart%%%%%% '
              call hart c.... normalization of basis
c
        do 820 m=0,iz
      do 812 kkk=1,iu
          rp1(kkk)=poly(m,kkk)
812       rp2(kkk)=poly(m,kkk)
      call inprod
      do 815 kkk=1,iu
          poly(m,kkk)=(poly(m,kkk))/(sqrt(rip))
815   continue
820   continue c....read in the ideal image and the PSF
      write(6,*)' input name for header file xxxxxx.xxx   '
      read(5,933)flh
      fileh=pre//flh
      open(25,file=fileh,status='new')

933       format(a10)
          write(6,*)' input trial number for this input fn '
          read(5,964)ntrial
964   format (a2)
          write(6,*)' input filename of fwd soln xxxxxx.xxx  '
          read(5,933)filen
c... set the restoration bandwidth
          write(6,*)' high freq c/o '
          read(5,*)ifini npol=(2*ifini)+1 c!!!!!!!!!!!!!!!build the selected orthogonal set!!!!!!!!
c...always include the dc component
          do 24 ii=1,iu
24        rleg(1,ii)=poly(0,ii)
              iptr=0
              do 25 j=1,ifini
          iptr=iptr+2
          jind=(j*2)-1
              do 22 ii=1,iu
                      rleg(iptr,ii)=poly(jind,ii)

rleg(iptr+1,ii)=poly(jind+1,ii)
22            continue
25    continue
```

```
        write(6,*)'$$$$$$ orthonomal setup done $$$$$$'
c@@@@@@@@@@@@@@@@@@@@
c::::::::::::::::::::::::::::::::::::::::::::::::
c...import the transfer function matrix
        write(6,*)' input filename of TV transfer fn matrix
xxxxxx.xxx '
        read(5,933)fileg
        filegx=pre//fileg
        open(20,file=filegx,status='old')

do 43 i=1,iu
      read(20,*,end=433)(tvtfm(i,j),j=1,iu)
43      continue
433     close(20)

c>>>>>>>>>calc b(k) using matrix
approach>>>>>>>>>>>>>>>>>>>>>>>>>
      write(6,*)'......calculating b(k)......'
c****use transpose matrix
        iz=(2*ifini)+1
        do 10 k=1,iz
      do 9 ic=1,iu
      sum=0.
      do 8 ir=1,iu
                sum=sum+(rleg(k,ir)*tvtfm(ir,ic))
8       continue
        b(k,ic)=sum
9       continue
10      continue
c>>>>>>>>>>>>>>>>>>>>>>>>>>>>>>>>>>>>>>>>>>>>>>>>>
c?????????calc c(k)s??????????????????????????????
      write(6,*)'++++++calculating c(k)++++++'
      do 21 kkk=1,iu
21      c(1,kkk)=b(1,kkk)
        do 23 m=1,iz
23      a(m,m)=1.
c......calculate Gram-Schmidt coefficients
      do 50 m=2,iz do 40 j=1,m-1
      do 30 kkk=1,iu
        rp1(kkk)=c(j,kkk)
30      rp2(kkk)=rp1(kkk)
        call inprod
        rnorm=rip do 29 kkk=1,iu
        rp1(kkk)=c(j,kkk)
29      rp2(kkk)=b(m,kkk)
        call inprod
```

```
                    a(m,j)=-1.*(rip/rnorm)
40       continue c....now calculate c(m) by G-S orthogonalization
         do 46 ii=1,iu
46       sumc(ii)=0.

do 49 j=1,m-1
         do 48 kkk=1,iu
             sumc(kkk)=sumc(kkk)+(a(m,j)*c(j,kkk))
48       continue
49       continue
         do 47 kkk=1,iu
             c(m,kkk)=b(m,kkk)+sumc(kkk)
47       continue
50       continue c???????????????????????????????????????????????????????????
c....normalization
         do 720 m=1,iz
         do 712 kkk=1,iu
             rp1(kkk)=c(m,kkk)
712          rp2(kkk)=c(m,kkk)
         call inprod
         cnorm(m)=sqrt(rip)
         do 715 kkk=1,iu
             c(m,kkk)=(c(m,kkk))/(sqrt(rip))
715      continue
720      continue
c^^^^^^^^^^^^^^^^^calculate taus^^^^^^^^^^^^^^^^^^^
         write(6,*)'======calculating tau======'
         do 75 k=1,iz
75       tau(k,k)=a(k,k)
         do 90 m=2,iz
         do 85 i=1,m-1
         if(i.ne.m)then
             rsum=0.
         do 83 j=i,m-1
             rsum=rsum+(a(m,j)*tau(j,i))
83       continue
         tau(m,i)=rsum
         else
         endif
85       continue
90       continue
c  normalize taus by dividing by cnorms
         do 94 m=1,iz
         do 92 i=1,iz
         tau(m,i)=(tau(m,i)/cnorm(m))
92       continue
94       continue
```

```
c^^^^^^^^^^^^^^^^^^^^^^^^^^^^^^^^^^^^^^^^^^
c!!!!!!!!!!!!!!!!!!!calculate d(iz,iu)!!!!!!!!!!!!!!!!
      write(6,*)'!!!!!!!calculating d(iz,iu)!!!!!!!'
      do 110 m=1,iz
      do 105 i=1,m
      do 100 it=1,iu
          d(m,it)=d(m,it)+(tau(m,i)*rleg(i,it))
100   continue
105   continue
110   continue
c!!!!!!!!!!!!!!!!!!!!!!!!!!!!!!!!!!!!!!!!!!!!!!!!!!!!
c|||||||||||||||||||||||||||||||||||||||
      filex=pre//'d'//ntrial//filen(5:6)
     *    //fileg(5:6)//suf2
      fileh=pre//ntrial//filen(5:6)
     *    //fileg(5:6)//suf3
      filein=pre//filen(1:10)
      filegx=pre//fileg(1:10)
c::::::::::::::::::::::::::::::::::::::::::::::

c::::::::::::::::::::::::::::::::::::::::::::::
      open(19,file=filein,status='old')
      do 32 i=1,iu
      read(19,*,end=519)ri(i)
32        continue
519   close(19)

izk=npol
c...clear arrays
      do 190 iy=1,izk
190   f(iy)=0.
      do 191 iy=1,iu
191   h(iy)=0.
c#############compute fs#########################
      do 120 m=1,izk
      rsum=0.
      do 115 i=1,iu
          rsum=rsum+(d(m,i)*ri(i))
115   continue
      f(m)=rsum
      write(6,*)m,'c(m)= ',f(m)
120   continue c############################################### c$$$$$$$$$$$$$$$$calculate h$$$$$$$$$$$$$$$$$$$
      do 140 i=1,iu
      rsum=0.
              do 130 m=1,izk
          rsum=rsum+(c(m,i)*f(m))
```

```
130   continue
      h(i)=rsum
140   continue
c$$$$$$$$$$$$$$$$$$$$$$$$$$$$$$$$$$$$$$$$$$$$
      open(18,file=filex,status='new')
      do 150 i=1,iu
150      write(18,*)h(i)
      close(18)

777   continue
      write(6,*)filex
c?????????????????????????????????????
      write(25,*)'iu= ',iu
      close(25)
c!!!!!!!!!!
c>>>>>>>>>>>>>>>>>>>>>>>>>>>>>>>>>>>>>>>>
c::::::::::this section allows various process vectors and
matrices to
c:::::::::: be saved to disk for later analysis write(6,*)' write taufile (y/n)? '
        read(5,976)cxans
976     format(a1)
         if(cxans.eq.'y')then
         write(6,*)' enter name of taufile '
         read(5,977)taunm
977      format(a10)
         taunmx=pre//taunm
         open(27,file=taunmx,status='new')
         write(6,*)'iz= ',iz
         do 833 m=1,iz
         do 833 i=1,iz
         write(27,*)tau(m,i)
833     continue
         close(27)
         endif
888     write(6,*)' save to disk d(m) array ? '
        read(5,916)cyans
916     format(a1)
         if(cyans.eq.'y')then
556     write(6,*)' # rows= ',iz
        write(6,*)' input name of otpt file xxxxxx.xxx '
        read(5,933)obas
        obasx=pre//obas
        open(30,file=obasx,status='new')
        do 501 ibas=1,iz
        do 501 ku=1,iu
501     write(30,*)d(ibas,ku)
        close(30)
        endif
        write(6,*)' save to disk c(m) array ? '
        read(5,916)cyans
```

```
          if(cyans.eq.'y')then
          write(6,*)' input name of otpt file xxxxxx.xxx '
          read(5,933)obas
          obasx=pre//obas
          open(30,file=obasx,status='new')
          do 503 ibas=1,iz
          do 503 ku=1,iu
503       write(30,*)c(ibas,ku)
          close(30)
          endif
          write(6,*)' save to disk b(m) array ? '
          read(5,916)cyans
          if(cyans.eq.'y')then
          write(6,*)'iz=',iz
          write(6,*)' input name of otpt file xxxxxx.xxx '
          read(5,933)obas
          obasx=pre//obas
          open(31,file=obasx,status='new')
          do 504 ibas=1,iz
          do 504 ku=1,iu
504       write(31,*)b(ibas,ku)
          close(31)
          endif c>>>>>>>>>>>>>>>>>>>>>>>>>>>>>>>>>>>>>>>>>>>>
          stop
       end
```

*APPENDIX C*

```fortran
c     TVFPAT.FOR
c     FREQ DOMAIN DOBR THAT TAKES IDFT FOR TIME DOMAIN INV SOLN c....as most calculations involve complex operations, default
c....complex variables to begin with "c"
      implicit complex(c)

parameter(np=128,izz=128,dcval=11.3137,xval=5.6568,np2=128)
c....np is the number of time and frequency domain signal points
c....izz is the maximum number of basis functions
c....dcval and xval are used to assign the frequency domain
c.... attributes of the Hartley Basis Set complex cbn(izz,np),ccn(izz,np),csumc(np),ctrue(np)
      complex cdn(izz,np),cp(izz,np),ca(izz,izz),ctau(izz,izz)
        complex cnorm(izz),cf(izz),ch(np),cfwd(np),cfwdn(np)
        real atrue(np2),arec(np2),xo(np)
c...Freq. domain variable names correspond to those used in
c...time domain algorithm
c         cbn(m,k)--->b(m,k),  ccn(m,k)--->c(m,k),
cdn(m,k)--->d(m,k)
c         the hartley basis is in cp(m,k)
c         gram-schmidt coef are in array ca, tau in ctau
c         fwd soln-->cfwd. Freq domain inv soln-->ch,
c                   time domain inv soln-->xo
c.............................................................
......
        character*10 tfnm,fnm,tnam,onm
      character*13 pre
        character*30 tfnmx,fnmx,tnamx,onmx pre="c:\fort\data\"
900     format(a10)

c......select the DOBR bandwidth
      write(6,*)' input fmax '
        read(5,*)ifmax
c...and compute the number of Hartley Basis vectors to be used
      npol=(2*ifmax)+1 c.... input the filename for the Fourier transforms of the vector
c...set b(m,k). These are most easily obtained by dumping the
c...vector set b(m,k) computed using time-domain DOBR and doing
c....FFT of each member
        write(6,*)' input TV B(m,k) file (xxxxxx.fcx) '
        read(5,900)tfnm
        tfnmx=pre//tfnm
c...The FFT of the forward solution is also needed
        write(6,*)' input FWD soln file (xxxxxx.fcx) '
        read(5,900)fnm
```

```
      fnmx=pre//fnm
      open(19,file=fnmx,status='old')
c...cfpwr computes running sum of fwd soln pwr
      cfpwr=(0.,0.)
      do 3 i=1,np
      read(19,*)cfwd(i)
      cfpwr=cfpwr+(cfwd(i)*conjg(cfwd(i)))
3        continue
      close(19)
      open(20,file=tfnmx,status='old')
      do 6 m=1,npol
      do 5 i=1,np
      read(20,*)cbn(m,i)
5        continue
6        continue
      close(20)

c...assign Freq. Domain Hartley basis set P(m,k) based on 128 pt
signal
c....assign dc val
      cp(1,1)=(dcval,0.)
c....assign spectra for even-indexed basis
      do 10 i=2,npol
      ibin1=(i/2)+1
      ibin2=(np+1)-(i/2)
      cp(i,ibin1)=(xval,-xval)
      cp(i,ibin2)=(xval,xval)
10       continue
c...and for odd indexed basis
      do 15 i=3,npol,2
      ibin1=((i-1)/2)+1
      ibin2=(np+1)-((i-1)/2)
      cp(i,ibin1)=(xval,xval)
      cp(i,ibin2)=(xval,-xval)
15       continue
c...note that this assignment assumed that the basis ordering of
haropd
c...was: 1=dc, 2=+1hz,3=-1hz,4=2hz,5=-2hz....
c?????????calc c(k)s?????????????????????????????????????
      npxx=ifmax
      write(6,*)'++++++calculating c(k)++++++'
      ccn(1,1)=cbn(1,1)
      do 21 kkk=1,npxx
      ccn(1,(np2-kkk+1))=cbn(1,(np2-kkk+1))
21       ccn(1,(kkk+1))=cbn(1,(kkk+1))
      do 23 m=1,npol
23       ca(m,m)=(1.,0.)

c......calculate ca coef (complex gram-schmidt coef.)

do 50 m=2,npol
```

```
        do 40 j=1,m-1 csum2=(0.,0.)
        csum2=(ccn(j,1)*(conjg(ccn(j,1))))
        do 30 kkk=1,npxx csum2=csum2+(ccn(j,(np2-kkk+1))*(conjg(ccn(j,(np2-kkk+1)))))
        csum2=csum2+(ccn(j,kkk+1)*(conjg(ccn(j,kkk+1))))
30      continue
        cnormx=csum2
c.......save the normalization factor for each vector
c(m).........
        cnorm(j)=csqrt(cnormx)
c.........................
        csum2=(0.,0.)
        csum2=(ccn(j,1)*conjg(cbn(m,1)))
        do 29 kkk=1,npxx
           csumc2=csum2+(ccn(j,kkk+1)*conjg(cbn(m,kkk+1)))

csum2=csum2+(ccn(j,(np2-kkk+1))*conjg(cbn(m,np2-kkk+1)))

29      continue
        cip=csum2
        ca(m,j)=-1.*(cip/cnormx)
40      continue do 46 ii=1,np
46      csumc(ii)=(0.,0.)

do 49 j=1,m-1
        csumc(1)=csumc(1)+(ca(m,j)*ccn(j,1))
        do 48 kkk=1,npxx
        csumc(kkk+1)=csumc(kkk+1)+(ca(m,j)*ccn(j,kkk+1))

csumc(np2-kkk+1)=csumc(np2-kkk+1)+(ca(m,j)*ccn(j,(np2-kkk+1)))

48      continue
49      continue
        ccn(m,1)=cbn(m,1)+csumc(1)
        do 47 kkk=1,npxx
                ccn(m,kkk+1)=cbn(m,kkk+1)+csumc(kkk+1)

ccn(m,(np2-kkk+1))=cbn(m,(np2-kkk+1))+csumc(np2-kkk+1)
47      continue
50      continue c??????????????????????????????????????????????????????????
c....now normalize
c...need the final norm
        crip=(0.,0.)
        crip=crip+(ccn(npol,1)*(conjg(ccn(npol,1))))
        do 712 kkk=1,npxx
```

3

```
              crip=crip+(ccn(npol,kkk+1)*(conjg(ccn(npol,kkk+1))))
    crip=crip+(ccn(npol,(np2-kkk+1))*(conjg(ccn(npol,(np2-kkk+1)))))
712        continue
           cnorm(npol)=csqrt(crip)

do 720 m=1,npol
           ccn(m,1)=(ccn(m,1))/(cnorm(m))
           do 715 kkk=1,npxx
           ccn(m,kkk+1)=(ccn(m,kkk+1))/(cnorm(m))
           ccn(m,(np2-kkk+1))=ccn(m,(np2-kkk+1))/cnorm(m)
715        continue
720        continue
c^^^^^^^^^^^^^^^calculate taus^^^^^^^^^^^^^^^^^^^
           write(6,*)'======calculating tau======'
       do 75 k=1,npol
75         ctau(k,k)=ca(k,k)
       do 90 m=2,npol
       do 85 i=1,m-1
       if(i.ne.m)then
             crsum=(0.,0.)
           do 83 j=i,m-1
             crsum=crsum+(ca(m,j)*ctau(j,i))
83         continue
       ctau(m,i)=crsum
       else
       endif
85         continue
90         continue
c   normalize taus by dividing by cnorms
       do 94 m=1,npol
       do 92 i=1,npol
       ctau(m,i)=(ctau(m,i)/cnorm(m))
92         continue
94         continue
c!!!!!!!!!!!!!!!!!!!!!calculate d(iz,np)!!!!!!!!!!!!!!!
           write(6,*)'!!!!!!calculating d(iz,np)!!!!!!'
       do 110 m=1,npol
       do 105 i=1,m
c....test for even or odd and assign index
       fi=float(i)
       itest1=aint(fi/2.)
       itest2=anint(fi/2.)
c...if even
           if(itest1.eq.itest2)then
             ind1=(i/2)+1
             ind2=(np+1)-(i/2)
         cdn(m,ind1)=cdn(m,ind1)+(ctau(m,i)*cp(i,ind1))
         cdn(m,ind2)=cdn(m,ind2)+(ctau(m,i)*cp(i,ind2))
       else
       ind1=((i-1)/2)+1
       cdn(m,ind1)=cdn(m,ind1)+(ctau(m,i)*cp(i,ind1))
```

```
              if(i.gt.1)then
              ind2=(np+1)-((i-1)/2)
              cdn(m,ind2)=cdn(m,ind2)+(ctau(m,i)*cp(i,ind2))
              else
              endif endif
100           continue
105           continue
110           continue c!!!!!!!!!!!!!!!!!!!!!!!!!!!!!!!!!!!!!!!!!!!!!!!!!!!!!
c...this section applies to lab experiments where the true
c...inverse son is known. when unknown, a dummy file can be
c...used and snr values computed may be ignored.

write(6,*)' input 128 pt spectrum file of true signal '
       read(5,900)tnam
       tnamx=pre//tnam
       open(21,file=tnamx,status='old')
       sigp=0.
       do 160 i=1,np
       read(21,*)ctrue(i)
       atrue(i)=real(ctrue(i)*conjg(ctrue(i)))
       sigp=sigp+atrue(i)
160    continue
c!!!!!!!!!!!!!!!!!!!!!!!!!!!!!!!!!!!!!!!!!!!!!!!!!!!!!
       do 260 i=1,np
260       cfwdn(i)=cfwd(i)

do 120 m=1,npol
       crsum=(0.,0.)
       crsum=crsum+(cdn(m,1)*conjg(cfwdn(1)))
       do 115 i=1,npxx
            crsum=crsum+(cdn(m,i+1)*conjg(cfwdn(i+1)))
            crsum=crsum+(cdn(m,(np2-i+1))*conjg(cfwdn(np2-i+1)))

115    continue
       cf(m)=crsum
120    continue do 140 i=1,npxx+1
       crsum=(0.,0.)
       do 130 m=1,npol
       crsum=crsum+(ccn(m,i)*cf(m))
130    continue
       ch(i)=crsum
140    continue
       do 141 i=1,npxx
       crsum=(0.,0.)
       do 131 m=1,npol
       crsum=crsum+(ccn(m,(np2-i+1))*cf(m))
```

```
131     continue
        ch(np2-i+1)=crsum
141     continue
c!!!!!!!!!!!!!!!!!!!!!!!!!!!!!!!!!!!!!!!!!!!!!!!!!!!!!
        crsum=(0.,0.)
        crsum=crsum+(ch(1)*conjg(ch(1)))
        arec(1)=real(ch(1)*conjg(ch(1)))
        do 150 i=1,npxx
        crsum=crsum+(ch(i+1)*conjg(ch(i+1)))
        arec(i+1)=real(ch(i+1)*conjg(ch(i+1)))
        crsum=crsum+(ch(np2-i+1)*conjg(ch(np2-i+1)))
        arec(np2-i+1)=real(ch(np2-i+1)*conjg(ch(np2-i+1)))

150     continue
        write(6,*)'    recovered total pwr= ',crsum
c^^^^^^^^^^^^^^^^^^^^^^^^^^^^^^^
        snse=0.
        cfred=ctrue(1)-ch(1)
        snse=snse+real(cfred*conjg(cfred))

do 180 i=1,npxx
        cfred=ctrue(i+1)-ch(i+1)
        snse=snse+real(cfred*conjg(cfred))
        cfred=ctrue(np2-i+1)-ch(np2-i+1)
        snse=snse+real(cfred*conjg(cfred))

180     continue
        snrout2=10.*alog10(sigp/snse)
        write(6,*)' snr2= ',snrout2
c^^^^^^^^^^^^^^^^^^^^^^^^^^^^^^^^
c...obtain time-domain inverse soln by  IDFT
        write(6,*)' perform idft? 1=Y '
        read(5,*)iift
        if (iift.eq.1)then
c~~~~~~~~~~~~~~~~~~~~~~~~~~~~
        do 248 i=npxx+1,np2-npxx
248     ch(i)=(0.,0.)
        call fft(ch,128,7,1.0)
        do 249 li=1,np
249     xo(li)=real(ch(li))
        write(6,*)' input outname xxxxxx.xxx '
        read(5,900)onm
        onmx=pre//onm
        open(27,file=onmx,status='new')
        do 250 li=1,np
        write(27,*)xo(li)
250     continue
        close(27)
        else
        endif
```

```
777     continue
        stop
        end
```

I claim:

1. A method of using discrete orthogonal basis to restore a signal and/or image system degraded by time and/or spatially varying transfer functions said system being of linear type and represented by the equation [B] [o]=[i] wherein [o] is an original signal or image, [i] is a degraded signal or image and [B] is a system transfer function matrix, comprising:

estimating in estimating means a signal-to-noise ratio for a restored system;

selecting in selecting means a set of orthogonal basis set functions $p_{mk}$ where m=1,2,3 ... M is the index for the chosen orthogonal basis set with M members of length k=1,2,3 ... IU to provide a stable inverse solution based upon the estimated signal-to-noise ratio; and removing in removing means time and/or spatially varying distortions in the restored system by obtaining an inverse solution vector $O_k$ for a one dimensional restoration wherein:

$$o_k = \sum_{m=1}^{M} c_{mk} \left[ \sum_{k=1}^{IU} d_{mk} i_k \right]$$

wherein $d_{mk}$ is a vector set created by linear combinations of $p_{mk}$ weighted by $\tau_{mi}$, a set of constants formed by linear combinations of a, the standard Gram-Schmidt orthogonalization coefficients, and wherein:

$$[b]_m = [B]^{T*} [p]_m$$

where $[B]^{T*}$ is the transpose-complex conjugate of the matrix [B] and $[p]_m$ is an M member orthogonal basis set;

$$\tau_{mi} = \frac{a_{mi}}{\sqrt{\sum_k c_{mk} c_{mk}}} \quad m = i;$$

$$\tau_{mi} = \frac{1.0}{\sqrt{\sum_k c_{mk} c_{mk}}} \sum_{j=1}^{m-1} a_{mj} \tau_{ji} \, m \neq i; i = 1, \ldots, m-1;$$

$$c_{mk} = \sum_{i=1}^{m} \tau_{mi} b_{ik};$$

$$d_{mk} = \sum_{i=1}^{m} \tau_{mi} p_{ik}; m = 1,2,3 \ldots M$$

and an inverse solution vector $O_{\rho k}$ for a two dimensional restoration wherein:

$$o_{\rho\kappa} = \sum_{m=1}^{M} c_{\kappa_{mp}} \sum_{p=1}^{IU} d_{\kappa_{mp}} J_{p\kappa}$$

$\kappa = 1,2,3, \ldots, IU$ wherein $J_{\rho k}$ is an intermediary matrix of the form:

$$J_{\rho\kappa} = \sum_{m=1}^{M} c_{\rho_{mk}} \left[ \sum_{\kappa=1}^{IU} d_{\rho_{mk}} i_{\rho\kappa} \right]$$

$\rho = 1,2,3, \ldots, IU.$

2. The method set forth in claim 1, wherein said estimating of the signal-to-noise ratio of the restored system is provided by applying a given forward solution signal-to-noise ratio and selected set of orthogonal basis set functions $p_{mk}$ to a realistic simulation model of said system.

3. The method set forth in claim 1, wherein said set of orthogonal basis set functions $p_{mk}$ is selected from a group consisting of Hartley, Walsh, Haar, Legendre, Jacobi, Chebyshev, Gegenbauer, Hermite and Laguerre functions.

4. The method set forth in claim 2, wherein said set of orthogonal basis set functions $p_{mk}$ is selected from a group consisting of Hartley, Walsh, Haar, Legendre, Jacobi, Chebyshev, Gegenbauer, Hermite and Laguerre functions.

5. A method of using discrete orthogonal basis to restore a signal system degraded by a time varying transfer function, comprising:

estimating in estimating means a signal-to-noise ratio for a restored system;

selecting in selecting means a set of orthogonal basis set functions $p_{km}$=1,2,3 ... M is the index for the chosen orthogonal basis set with M members of length k=1,2,3 ... IU to provide a stable inverse solution based upon the estimated signal-to-noise ratio; and removing in removing means time varying distortions in the restored system by obtaining an inverse solution vector $O_k$ wherein:

$$o_k = \sum_{m=1}^{M} c_{mk} \left[ \sum_{k=1}^{IU} d_{mk} i_k \right]$$

wherein $d_{mk}$ is a vector set created by linear combinations of $p_{mk}$ weighted by $\tau_{mi}$, a set of constants formed by linear combinations of a, the standard Gram-Schmidt orthogonalization coefficients, and wherein:

$$[b]_m = [B]^{T*} [p]_m$$

where $[B]^{T*}$ is the transpose-complex conjugate of the matrix B and $p_m$ is an M member orthogonal basis set;

$$\tau_{mi} = \frac{a_{mi}}{\sqrt{\sum_k c_{mk} c_{mk}}} \quad m = i;$$

$$\tau_{mi} = \frac{1.0}{\sqrt{\sum_k c_{mk} c_{mk}}} \sum_{j=1}^{m-1} a_{mj} \tau_{ji} \, m \neq i; i = 1, \ldots, m-1;$$

$$c_{mk} = \sum_{i=1}^{m} \tau_{mi} b_{ik};$$

$$d_{mk} = \sum_{i=1}^{m} \tau_{mi} p_{ik} \, m = 1,2,3 \ldots M.$$

6. The method set forth in claim 5 wherein said estimating of the signal-to-noise ratio $SNR_{pred}$ is provided by:

$$SNR_{pred} = 10 \log \frac{|O_{true}|^2}{|O_{noise}|^2_{inv} + |O_{intrinsic}|^2}$$

wherein $|O_{true}|^2$ is the signal power in the original, undegraded signal/image, $|O_{intrinsic}|^2$ is the inverse solution noise power due to the approximate nature of the inverse solution and $|O_{noise}|^2$ is the noise power in the inverse solution power due to added noise in the forward solution.

7. The method set forth in claim 6, wherein said set of orthogonal basis set functions $p_{mk}$ is selected from a group consisting of Hartley, Walsh, Haar, Legendre, Jacobi, Chebyshev, Gegenbauer, Hermite and Laguerre functions.

8. The method set forth in claim 5, wherein said set of orthogonal basis set functions $p_{mk}$ is selected from a group consisting of Hartley, Walsh, Haar, Legendre, Jacobi, Chebyshev, Gegenbauer, Hermite and Laguerre functions.

9. A method of using discrete orthogonal basis to restore an image system degraded by time and spatially varying transfer functions, comprising:

estimating in estimating means a signal-to-noise ratio for a restored system;

selecting in selecting means a set of orthogonal basis set functions $p_{mk}$ to provide a stable inverse solution based upon the estimated signal-to-noise ratio; and removing in removing means time and spatially varying distortions in the restored system by obtaining an inverse solution vector $O_{pk}$ wherein:

$$O_{p\kappa} = \sum_{m=1}^{M} c_{\kappa_{mp}} \sum_{\rho=1}^{IU} d_{\kappa_{mp}} J_{p\kappa}$$

$$\kappa = 1,2,3,\ldots,IU$$

wherein $d_{mk}$ is a vector set created by linear combinations of $p_{mk}$ weighted by $\tau_j$, a set of constants formed by linear combinations of a, the standard Gram-Schmidt orthogonalization coefficients, and $J_{pk}$ is an intermediary matrix of the form:

$$J_{p\kappa} = \sum_{m=1}^{M} c_{p_{mk}} \left[ \sum_{\kappa=1}^{IU} d_{p_{mk}} I_{p\kappa} \right]$$

$$\rho = 1,2,3,\ldots,IU.$$

10. The method set forth in claim 9, wherein said estimating of the signal-to-noise ratio $SNR_{pred}$ is provided by simulating a noiseless forward solution and determining the intrinsic noise shown as the difference between the restored image and the original image and further considering recovered added noise.

11. The method set forth in claim 10, wherein said estimated signal-to-noise ratio $SNR_{pred}$ is $$SNR_{pred} = 10 \log \frac{|O_{true}|^2}{|O_{noise_{inv}}|^2 + |O_{intrinsic}|^2}$$

wherein $|O_{true}|^2$ is the signal power in the original, undegraded signal/image, $|O_{intrinsic}|^2$ is the inverse solution noise power due to the approximate nature of the inverse solution and $|O_{noise}|^2$ is the noise power in the inverse solution power due to added noise in the forward solution.

12. The method set forth in claim 9, wherein said estimated signal-to-noise ratio $SNR_{pred}$ is $$SNR_{pred} = 10 \log \frac{|O_{true}|^2}{|O_{noise_{inv}}|^2 + |O_{intrinsic}|^2}$$

wherein $|O_{true}|^2$ is the signal power in the original, undegraded signal/image, $|O_{intrinsic}|^2$ is the inverse solution noise power due to the approximate nature of the inverse solution and $|O_{noise}|^2$ is the noise power in the inverse solution power due to added noise in the forward solution.

13. A programmable apparatus, comprising:

means for computing; and readable memory defining a process for estimating a signal-to-noise ratio for a restored system;

selecting a set of orthogonal basis set functions $P_{mk}$ m=1,2,3 . . . M is the index for the chosen orthogonal basis set with M members of length k=1,2,3 . . . IU to provide a stable inverse solution based upon the estimated signal-to-noise ratio; and removing time and/or spatially varying distortions in the restored system by obtaining an inverse solution vector $O_k$ for a one dimensional restoration wherein:

$$o_k = \sum_{m=1}^{M} c_{mk} \left[ \sum_{k=1}^{IU} d_{mk} i_k \right]$$

wherein $d_{mk}$ is a vector set created by linear combinations of $p_{mk}$ weighted by $\tau_{mi}$, a set of constants formed by linear combinations of a, the standard Gram-Schmidt orthogonalization coefficients, and $$[b]_m = [B]^{T*}[p]_m$$

where $[B]^{T*}$ is the transpose-complex conjugate of the matrix $[B]$ and $[p]_m$ is an M member orthogonal basis set;

$$\tau_{mi} = \frac{a_{mi}}{\sqrt{\sum_k c_{mk} c_{mk}}} \quad m = i;$$

$$\tau_{mi} = \frac{1.0}{\sqrt{\sum_k c_{mk} c_{mk}}} \sum_{j=1}^{m-1} a_{mj} \tau_{ji} \, m \neq i; i = 1,\ldots,m-1;$$

$$c_{mk} = \sum_{i=1}^{m} \tau_{mi} b_{ik};$$

$$d_{mk} = \sum_{i=1}^{m} \tau_{mi} p_{ik}; m = 1,2,3 \ldots M$$

and an inverse solution vector $O_{pk}$ for a two dimensional restoration wherein:

$$O_{p\kappa} = \sum_{m=1}^{M} c_{\kappa_{mp}} \sum_{\rho=1}^{IU} d_{\kappa_{mp}} J_{p\kappa}$$

$$\kappa = 1,2,3,\ldots,IU$$

wherein $J_{pk}$ is an intermediary matrix of the form:

$$J_{p\kappa} = \sum_{m=1}^{M} c_{p_{mk}} \left[ \sum_{\kappa=1}^{IU} d_{p_{mk}} I_{p\kappa} \right]$$

$$\rho = 1,2,3,\ldots,IU.$$

14. A programmable apparatus, comprising:

means for computing; and readable memory defining a process for estimating a signal-to-noise ratio for a restored system;

selecting a set of orthogonal basis set functions $p_{mk}$ where m=1,2,3 . . . M is the index for the chosen orthogonal basis set with M members of length k=1,2,3 . . . IU to provide a stable inverse solution based upon the estimated signal-to-noise ratio; and removing time varying distortions in the restored system by obtaining an inverse solution vector $o_k$ wherein:

$$o_k = \sum_{m=1}^{M} c_{mk} \left[ \sum_{k=1}^{IU} d_{mk} i_k \right]$$

wherein d is a vector set created by linear combinations of $p_{mk}$ weighted by $\tau_{mi}$, a set of constants formed by linear combinations of a, the standard Gram-Schmidt orthogonalization coefficients, and:

$$[b]_m = [B]^{T*}[p]_m$$

where $[B]^{T*}$ is the transpose-complex conjugate of the matrix $[B]$ and $[p]_m$ is an M member orthogonal basis set;

$$\tau_{mi} = \frac{a_{mi}}{\sqrt{\sum_k C_{mk}C_{mk}}} \quad m = i;$$

$$\tau_{mi} = \frac{1.0}{\sqrt{\sum_k C_{mk}C_{mk}}} \sum_{j=1}^{m-1} a_{mj}\tau_{ji} \; m \neq i; \; i = 1, \ldots, m-1;$$

$$c_{mk} = \sum_{i=1}^{m} \tau_{mi}b_{ik};$$

$$d_{mk} = \sum_{i=1}^{m} \tau_{mi}p_{ik}. \; m = 1,2,3 \ldots M.$$

15. A programmable apparatus, comprising:

means for comparing; and readable memory defining a process for estimating means a signal-to-noise ratio for a restored system;

selecting a set of orthogonal basis set functions $p_{mk}$ to provide a stable inverse solution based upon the estimated signal-to-noise ratio; and removing time and spatially varying distortions in the restored system by obtaining an inverse solution vector $o_{pk}$ wherein:

$$O_{\rho\kappa} = \sum_{m=1}^{M} c_{\tau_{m\rho}} \sum_{\rho=1}^{IU} d_{\tau_{m\rho}}J_{\rho\kappa}$$

$$\kappa = 1,2,3, \ldots, IU$$

wherein $d_{mk}$ is a vector set created by linear combinations of $p_{mk}$ weighted by $\tau_{mi}$, a set of constants formed by linear combinations of a, the standard Gram-Schmidt orthogonalization coefficients, and $J_{\rho k}$ is an intermediary matrix of the form:

$$J_{\rho\kappa} = \sum_{m=1}^{M} c_{\rho_{m\kappa}} \left[ \sum_{\kappa=1}^{IU} d_{\rho_{m\kappa}}J_{\rho\kappa} \right]$$

$$\rho = 1,2,3, \ldots, IU.$$

16. A method of using discrete orthogonal basis to restore a signal and/or image system degraded by time and/or spatially varying transfer functions said system being of linear type and represented by the equation $[B][o]=[i]$ wherein [o] and [i] are length N column and row vectors and [B] is an N×N non-singular transfer function matrix, comprising:

estimating in estimating means a signal-to-noise ratio for a restored system;

selecting in selecting means a set of orthogonal basis set functions $P_{mk}$ where m=1,2,3 ... M is the index for the chosen orthogonal basis set with M members of length k=1,2,3 ... N to provide a stable inverse solution based upon the estimated signal-to-noise ratio; and removing in removing means time and/or spatially varying distortions in the restored system by obtaining an inverse solution vector $O_k$ for a one dimensional restoration wherein:

$$O_k = \sum_{m=1}^{M} C_{mk} \frac{1}{N} \sum_{k=1}^{N} D_{mk}I^*_k$$

wherein $I_k$ is a fourier transform of the forward solution and $O_k$ is a fourier transform of the inverse solution and a time domain solution may be obtained by $$\mathcal{F}^{-1}(O_k) = o_k$$

wherein $$[B]_m = [F]^{T*}[P]_m$$

where $$[F] = [DFT][B][IDFT]$$

and [DFT]=discrete fourier transform and [IDFT]= inverse fourier transform matrices, a. $$a_{mi} = \frac{\sum_{k=1}^{N} C_{mk}A^*_{ik}}{\sum_{k=1}^{N} C_{mk}C^*_{mk}}$$

$i = 1, \ldots, m-1$ $m = 1, \ldots, M$ wherein a is the complex Gram-Schmidt coefficient and vector sets C and A define the characteristics of the system [B] for frequency domain discrete orthogonal basis restoration;

b. $$\tau_{mi} = \frac{1.0}{\sqrt{\sum_{k=1}^{N} C_{mk}C^*_{mk}}}$$

$m = i$ $$\tau_{mi} = \frac{1.0}{\sqrt{\sum_{k=1}^{N} C_{mk}C^*_{mk}}} \sum_{j=1}^{m-1} a_{mj}\tau_{ji}$$

$i = 1, \ldots, m-1$ $m = 1, \ldots, M,$ where $\tau$ is a constant formed by linear combinations of a;

c. $$C_{mk} = \sum_{i=1}^{m} \tau_{mi}A_{ik}$$

and d. $$D_{mk} = \sum_{i=1}^{m} \tau_{mi}P_{ik}$$

$m = 1,2,3, \ldots M.$

17. A programmable apparatus, comprising:

means for computing; and readable memory defining a process for estimating a signal-to-noise ratio for a restored system;

selecting a set of orthogonal basis set functions $P_{mk}$ m=1,2,3 ... M is the index for the chosen orthogonal basis set with M members of length k=1,2,3 ... N to provide a stable inverse solution based upon the estimated signal-to-noise ratio; and removing time and/or spatially varying distortions in the restored system by obtaining an inverse solution vector $O_k$ for a one dimensional restoration wherein:

$$O_k = \sum_{m=1}^{M} C_{mk} \frac{1}{N} \sum_{k=1}^{N} D_{mk} I^*_k$$

wherein $I_k$ is a fourier transform of the forward solution and $O_k$ is a fourier transform of the inverse solution and a time domain solution may be obtained by $$\mathcal{F}^{-1}(O_k) = o_k$$

wherein $$[B]_m = [F]^{T*} [p]_m$$

where $$[F] = [DFT][B][IDFT]$$

and [DFT]=discrete fourier transform and [IDFT]= inverse fourier transform matrices, $$a.\ a_{mi} = \frac{\sum_{k=1}^{N} C_{mk} A^*_{ik}}{\sum_{k=1}^{N} C_{mk} C^*_{mk}}$$

$i = 1, \ldots, m - 1$ $m = 1, \ldots, M$ wherein a is the complex Gram-Schmidt coefficient and vector sets C and A define the characteristics of the system [B] for frequency domain discrete orthogonal basis restoration;

$$b.\ \tau_{mi} = \frac{1.0}{\sqrt{\sum_{k=1}^{N} C_{mk} C^*_{mk}}}$$

$m = i$ $$\tau_{mi} = \frac{1.0}{\sum_{k=1}^{N} C_{mk} C^*_{mk}} \sum_{j=1}^{m-1} a_{mj} \tau_{ji}$$

$i = 1, \ldots, m - 1$ $m = 1, \ldots, M,$ where $\tau$ is a constant formed by liner combinations of a;

$$c.\ C_{mk} = \sum_{i=1}^{m} \tau_{mi} A_{ik}$$

and $$d.\ D_{mk} = \sum_{i=1}^{m} \tau_{mi} P_{ik}$$

* * * * *